United States Patent
Kim et al.

(10) Patent No.: US 12,105,900 B2
(45) Date of Patent: Oct. 1, 2024

(54) TOUCH INPUT DEVICE

(71) Applicant: HiDeep Inc., Seongnam-si (KR)

(72) Inventors: Seyeob Kim, Seongnam-si (KR);
Bonkee Kim, Seongnam-si (KR);
Beomkyu Ko, Seongnam-si (KR);
Hyoungwook Woo, Seongnam-si (KR);
Kiryoung Jung, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/552,494

(22) PCT Filed: Mar. 25, 2022

(86) PCT No.: PCT/KR2022/004265
§ 371 (c)(1),
(2) Date: Sep. 26, 2023

(87) PCT Pub. No.: WO2022/203471
PCT Pub. Date: Sep. 29, 2022

(65) Prior Publication Data
US 2024/0184382 A1 Jun. 6, 2024

(30) Foreign Application Priority Data

Mar. 26, 2021 (KR) .......................... 10-2021-0039402
Apr. 13, 2021 (KR) .......................... 10-2021-0047537
Apr. 22, 2021 (KR) .......................... 10-2021-0052524

(51) Int. Cl.
*G06F 3/03* (2006.01)
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC ............... G06F 3/0412; G06F 3/04166; G06F 3/04182; G06F 3/04184;
(Continued)

(56) References Cited

U.S. PATENT DOCUMENTS

2015/0154927 A1* 6/2015 Li ........................ G09G 3/3677
345/214
2016/0372078 A1* 12/2016 Song ........................ G09G 3/20
(Continued)

FOREIGN PATENT DOCUMENTS

KR 20150002326 A 1/2015
KR 10-2016-0025443 3/2016
(Continued)

OTHER PUBLICATIONS

International Search Report issued in PCT/KR2022/004265.
(Continued)

*Primary Examiner* — Insa Sadio
(74) *Attorney, Agent, or Firm* — The Belles Group, P.C.

(57) ABSTRACT

The present invention relates to a multifunctional touch input device capable of detecting a touch position, driving a stylus pen, and detecting a position of the stylus pen. The touch input device includes a sensor unit and a control unit, the sensor unit including a plurality of patterns. The plurality of patterns include a first pattern extending in a first direction, a second pattern disposed adjacent to the first pattern, a third pattern extending in a second direction different from the first direction, and a fourth pattern disposed adjacent to the third pattern. Here, the plurality of first third patterns have one ends electrically connected to the control unit and the other ends electrically opened. The plurality of first patterns have the other ends that are electrically connected to each other, and the plurality of third patterns have the other ends that are electrically connected to each other.

6 Claims, 36 Drawing Sheets

(58) Field of Classification Search
CPC ... G09G 2310/0267; G09G 2310/0286; G09G 2310/08; G09G 2354/00; G09G 3/20; G11C 19/28; G11C 19/287
See application file for complete search history.

(56) References Cited

U.S. PATENT DOCUMENTS

| | | |
|---|---|---|
| 2018/0004324 A1 | 1/2018 | Park |
| 2018/0321793 A1 | 11/2018 | Kim et al. |
| 2019/0102015 A1 | 4/2019 | Kim et al. |
| 2019/0332210 A1 | 10/2019 | Lee et al. |
| 2021/0072864 A1 | 3/2021 | Park |

FOREIGN PATENT DOCUMENTS

| | | |
|---|---|---|
| KR | 20180003816 A | 1/2018 |
| KR | 10-2018-0125672 | 11/2018 |
| KR | 20180122761 A | 11/2018 |
| KR | 20190038707 A | 4/2019 |
| KR | 20190125554 A | 11/2019 |
| KR | 10-2019-0137192 | 12/2019 |
| KR | 20210019863 A | 2/2021 |
| KR | 20210029862 A | 3/2021 |

OTHER PUBLICATIONS

Office Action issued in Korean Application No. 10-2021-0039402.
Office Action issued in Korean Application No. 10-2021-0052524 on Jun. 27, 2024.

\* cited by examiner

|  | Embodiment 1 | Embodiment 2 | Embodiment 3 |
|---|---|---|---|
| Pattern | | | |
| Total Channel | 70~80 | 90~100 | 90~100 |
| 2D TX / RX | TX 20, RX 40 | TX 40, RX 40 | TX 40, RX 40 |
| Stylus | TX 10~20 | TX 10~20 | TX 10~20 |
| Left and right Trace | 20+20(40) | 20+20(40) | 30+30(60) |

FIG 18

TOUCH INPUT DEVICE

CROSS-REFERENCE TO RELATED PATENT APPLICATIONS

This U.S. non-provisional patent application is a U.S. national stage application under 35 U.S.C. § 371 of PCT Application No. PCT/KR2022/004265, filed Mar. 25, 2022, which claims priority to Korean Patent Application No. 10-2021-0052524, filed on Apr. 22, 2021, Korean Patent Application No. 10-2021-0047537, filed on Apr. 13, 2021, and Korean Patent Application No. 10-2021-0039402, filed on Mar. 26, 2021. The disclosures of the aforementioned priority applications are incorporated herein by reference in their entireties.

TECHNICAL FIELD

The present disclosure relates to a multifunctional touch input device capable of detecting a touch position, driving a stylus pen, and detecting a position of the stylus pen.

BACKGROUND ART

FIG. 1 is a schematic view for explaining that an output voltage Vout of a capacitor voltage amplitude (CVA) is varied according to a position of a stylus pen 10 on a typical flexible display panel.

Referring to FIG. 1, a reason why the output of the CVA is varied depending on the position of the pen 10 on the flexible display panel is that an impedance ratio of both sides based on the pen 10 on a sensing line is varied.

Based on a major axis of the typical flexible display panel, a resistance R of a metal mesh touch sensor is approximately 1.2k ohm, and a capacitor C is approximately 250 pF.

Based on ten distributed models, at a driving frequency of 300 kHz, an impedance of the capacitor is approximately 200 times (120 ohm vs. 1/(2δ*300k*25 pF)=21k ohm) greater than a resistance thereof. Therefore, the capacitor is a main factor.

FIG. 2 is a view for explaining through current sensing that output voltages Vout1 and Vout2 of the CVA are varied according to the position of the stylus pen 10 in FIG. 1, and FIG. 3 is a view for explaining through voltage sensing that the output voltages Vout1 and Vout2 of the CVA are varied according to the position of the stylus pen 10 in FIG. 1.

Referring to FIGS. 2 and 3, the output voltages of the CVA are varied according to the position of the stylus pen 10 on the sensing line. That is, the output voltage of the CVA increases as the stylus pen 10 moves toward a sensing circuit unit 50 and decreases as the stylus pen 10 moves away from the sensing circuit unit 50.

DISCLOSURE OF THE INVENTION

Technical Problem

The present disclosure provides a multifunctional touch input device capable of detecting a touch position, driving a stylus pen, and detecting a position of the stylus pen.

The present disclosure also provides a touch input device capable of solving a limitation in which an output voltage of a sensing circuit unit is varied according to a position of a stylus pen.

Technical Solution

An embodiment of the present invention provides a touch input device including: a sensor unit; and a control unit configured to control the sensor unit. Here, the sensor unit includes: a first pattern extending in a first direction: a second pattern disposed adjacent to the first pattern and extending in the first direction: a third pattern extending in a second direction different from the first direction: and a fourth pattern disposed adjacent to the third pattern and extending in the second direction. Also, each of the first and second patterns is provided in plurality along the second direction, each of the third and fourth patterns is provided in plurality along the first direction, the plurality of first and third patterns have one ends electrically connected to the control unit and the other ends electrically opened, the plurality of second patterns have the other ends that are electrically connected to each other, and the plurality of fourth patterns have the other ends that are electrically connected to each other.

In an embodiment of the present invention, a touch input device includes: a sensor unit: and a control unit configured to control the sensor unit. Here, the sensor unit includes: a first pattern including first-a and first-b patterns alternately arranged in a first direction: a second pattern disposed adjacent to the first pattern: a third pattern extending in a second direction different from the first direction; and a fourth pattern disposed adjacent to the third pattern and extending in the second direction. Also, the first-a patterns are electrically connected to each other, and the first-b patterns are electrically connected to each other, each of the first and second patterns is provided in plurality along the second direction, each of the third and fourth patterns is provided in plurality along the first direction, the plurality of first and third patterns have one ends electrically connected to the control unit and the other ends electrically opened, the plurality of second patterns have the other ends that are electrically connected to each other, and the plurality of fourth patterns have the other ends that are electrically connected to each other.

In the touch input device according to another embodiment, the first-a patterns and the first-b patterns may be connected to the control unit, the control unit may control the sensor unit to operate in a touch sensing mode, and the control unit may sense a touch position based on a signal obtained by subtracting a first sensing signal received from the first-a patterns and a second sensing signal received from the second-a patterns from each other.

In the touch input device according to another embodiment, the first-a pattern farthest from the control unit among the first-a patterns arranged along the first direction may be connected to the control unit, and the first-b pattern closest to the control unit among the first-b patterns arranged along the first direction may be connected to the control unit.

In the touch input device according to an embodiment or another embodiment, the first pattern may have an opening in which the second pattern is disposed, and the third pattern may have an opening in which the fourth pattern is disposed.

In the touch input device according to an embodiment or another embodiment, the control unit may control the sensor unit to operate in one of a touch sensing mode, a stylus driving mode, and a stylus sensing mode.

In the touch input device according to an embodiment or another embodiment, the plurality of second patterns may have one ends connected to the control unit, and the control unit may apply a stylus driving signal to at least one of the plurality of second patterns in the stylus driving mode of the sensor unit.

In the touch input device according to an embodiment or another embodiment, the plurality of second patterns may have one ends electrically opened, and the control unit may apply a stylus driving signal to at least one of the plurality of second patterns in the stylus driving mode of the sensor unit.

In the touch input device according to an embodiment or another embodiment, the plurality of second patterns may have one ends electrically opened, and the control unit may apply a stylus driving signal to at least one of the plurality of first patterns in the stylus driving mode of the sensor unit.

In the touch input device according to an embodiment or another embodiment, the plurality of second and fourth patterns may have one ends connected to the control unit, and the control unit may sense a position of the stylus pen from a stylus sensing signal received from the plurality of second and fourth patterns in the stylus sensing mode of the sensor unit.

In the touch input device according to an embodiment or another embodiment, the plurality of second and fourth patterns may have one ends electrically opened, and the control unit may sense a position of the stylus pen from a stylus sensing signal received from the plurality of first and third patterns in the stylus sensing mode of the sensor unit.

In the touch input device according to an embodiment or another embodiment, the plurality of first and second patterns may be disposed on a different layer from the plurality of third and fourth patterns.

In an embodiment of the present invention, a touch input device includes: a sensor unit: and a control unit configured to control the sensor unit. Here, the sensor unit includes: a plurality of first patterns arranged in a first direction and a second direction different from the first direction and each having an opening: a plurality of second patterns disposed in the openings of the plurality of first patterns, respectively: a plurality of third patterns disposed on the same layer as the plurality of first patterns, each extending in the second direction, and each having an opening: and a plurality of fourth patterns disposed in the openings of the plurality of third patterns, respectively, and each extending in the second direction. Also, the first patterns arranged in the first direction among the plurality of first patterns are electrically connected to each other through a conductive bridge, among the first patterns arranged in the first direction, the first pattern disposed at one side is connected to the control unit, and the first pattern disposed at the other side is electrically opened, the second patterns arranged in the first direction among the plurality of second patterns are electrically connected to each other through a conductive bridge, the second pattern disposed at the other side among the second patterns arranged in the first direction is connected to the second patterns arranged in the second direction, the plurality of third patterns have one ends electrically connected to the control unit and the other ends electrically opened, and the plurality of fourth patterns have the other ends that are electrically connected to each other.

In the touch input device according to another embodiment, the control unit may control the sensor unit to operate in one of a touch sensing mode, a stylus driving mode, and a stylus sensing mode.

In the touch input device according to another embodiment, the control unit may apply a stylus driving signal to one of the first to fourth patterns in the stylus driving mode and sense a position of the stylus pen from a stylus sensing signal received from one of the first and second patterns and one of the third and fourth patterns in the stylus sensing mode.

In the touch input device according to another embodiment, the plurality of fourth patterns may have one ends connected to the control unit, the second pattern disposed at one side among the second patterns arranged along the first direction is electrically opened, and the control unit may apply a stylus driving signal to at least one of the plurality of fourth patterns in the stylus driving mode of the sensor unit.

In the touch input device according to another embodiment, the control unit may sense a position of the stylus pen from a stylus sensing signal received through the plurality of first and third patterns in the stylus driving mode of the sensor unit.

In the touch input device according to another embodiment, the plurality of fourth patterns may have one end electrically opened, the second pattern disposed at one side among the second patterns arranged along the first direction may be electrically opened, and the control unit may apply a stylus driving signal to at least one of the plurality of third patterns in the stylus driving mode of the sensor unit.

In the touch input device according to another embodiment, the control unit may sense a position of the stylus pen from a stylus sensing signal received through the plurality of first and third patterns in the stylus sensing mode of the sensor unit.

In the touch input device according to another embodiment, the second pattern or the fourth pattern may have an outer shape of an uneven structure, and the opening of first pattern or the third pattern may have a shape corresponding to the uneven structure.

In the touch input device according to another embodiment, the other ends of the plurality of second patterns may be electrically connected to the other ends of the plurality of fourth patterns.

In the touch input device according to another embodiment, a portion of the first pattern may overlap a portion of the second pattern in a vertical direction.

In the touch input device according to another embodiment, a portion of the third pattern may overlap a portion of the fourth pattern in the vertical direction.

In an embodiment of the present invention, a touch input device includes: a sensor unit: and a control unit configured to control the sensor unit. Here, the sensor unit includes: a first pattern extending in a first direction and having an opening: a second pattern disposed on the same layer as the first pattern, disposed in the opening of the first pattern, and extending in the first direction: a third pattern disposed on a different layer from the first pattern, extending in a second direction different from the first direction, and having an opening: a fourth pattern disposed on the same layer as the third pattern, disposed in the opening of the third pattern, and extending in the second direction; a fifth pattern disposed on the same layer as the first pattern, having a shape corresponding to a portion of the third pattern to overlap the third pattern, and electrically connected to the fourth pattern: and a sixth pattern disposed on the same layer as the third pattern, having a shape corresponding to a portion of the first pattern to overlap the first pattern, and electrically connected to the second pattern. Also, each of the first and second patterns is provided in plurality along the second direction, each of the third and fourth patterns is provided in plurality along the first direction, each of the fifth and sixth patterns is provided in plurality along the first and second directions, the plurality of first and third patterns have one ends electrically connected to the control unit and the other ends electrically opened, the plurality of second patterns have the other ends that are electrically connected to each other, and the plurality of fourth patterns have the other ends that are electrically connected to each other.

In the touch input device according to another embodiment, each of the first and third patterns may include a plurality of main pattern parts and a plurality of connection pattern parts connecting the plurality of main pattern parts to each other, the openings of the first and third patterns may be formed in the plurality of main pattern parts and the plurality of connection pattern parts, and the second and fourth patterns may have shapes corresponding to openings of the first and third patterns.

In the touch input device according to another embodiment, each of the first and third patterns may include a plurality of main pattern parts and a plurality of connection pattern parts connecting the plurality of main pattern parts to each other, the openings of the first and third patterns may be formed in the plurality of main pattern parts and the plurality of connection pattern parts, and each of the second and fourth patterns may be a bar pattern.

In the touch input device according to another embodiment, the control unit may control the sensor unit to operate in one of a touch sensing mode, a stylus driving mode, and a stylus sensing mode.

In the touch input device according to another embodiment, the control unit may apply a stylus driving signal to at least one of the first to fourth patterns in the stylus driving mode and sense a position of the stylus pen from a stylus sensing signal received through one of the first and second patterns and one of the third and fourth patterns in the stylus sensing mode.

In an embodiment of the present invention, a touch input device includes: a sensor unit: and a control unit configured to control the sensor unit. Here, the sensor unit includes: a first pattern extending in a first direction: a second pattern disposed adjacent to the first pattern and extending in the first direction: a third pattern extending in a second direction different from the first direction; and a fourth pattern disposed adjacent to the third pattern and extending in the second direction. Also, each of the first and second patterns is provided in plurality along the second direction, each of the third and fourth patterns is provided in plurality along the first direction, the plurality of first and third patterns have one ends electrically connected to the control unit and the other ends electrically opened, the plurality of second patterns have the other ends that are electrically connected to each other, the plurality of fourth patterns have the other ends that are electrically connected to each other, the plurality of first to fourth patterns are disposed in an active area, and the sensor unit includes at least one trace having one end connected to the control unit and the other end connected to the other ends of the plurality of second patterns and disposed in a non-active area outside the active area.

In the touch input device according to another embodiment, the control unit may control the sensor unit to operate in one of a touch sensing mode, a stylus driving mode, and a stylus sensing mode.

In the touch input device according to another embodiment, the plurality of second patterns may have one ends connected to the control unit, and the control unit may apply a stylus driving signal to the plurality of second patterns and the trace in the stylus driving mode and sense a position of the stylus pen from a stylus sensing signal received through one group of the plurality of first patterns, the plurality of second patterns, and the trace and one group of the plurality of third patterns and the plurality of fourth patterns in the stylus sensing mode.

In an embodiment of the present invention, a touch input device includes: a sensor unit: and a control unit configured to control the sensor unit. Here, the sensor unit includes: a plurality of first patterns arranged in a first direction: and a plurality of second patterns arranged in a second direction different from the first direction. Also, among the plurality of first patterns, the first pattern disposed at one edge is connected to the control unit, and the first pattern disposed at the other edge is connected to a capacitor, and among the plurality of second patterns, the second pattern disposed at one edge is connected to the control unit, and the second pattern disposed at the other edge is connected to a capacitor.

Advantageous Effects

The touch input device according to the embodiment of the present invention may be used to detect the touch position, drive the stylus pen, and detect the position of the stylus pen.

Also, the touch input device according to the embodiment of the present invention may solve the limitation in which the output voltage of the sensing circuit unit is varied according to the position of the stylus pen.

Figure 6:
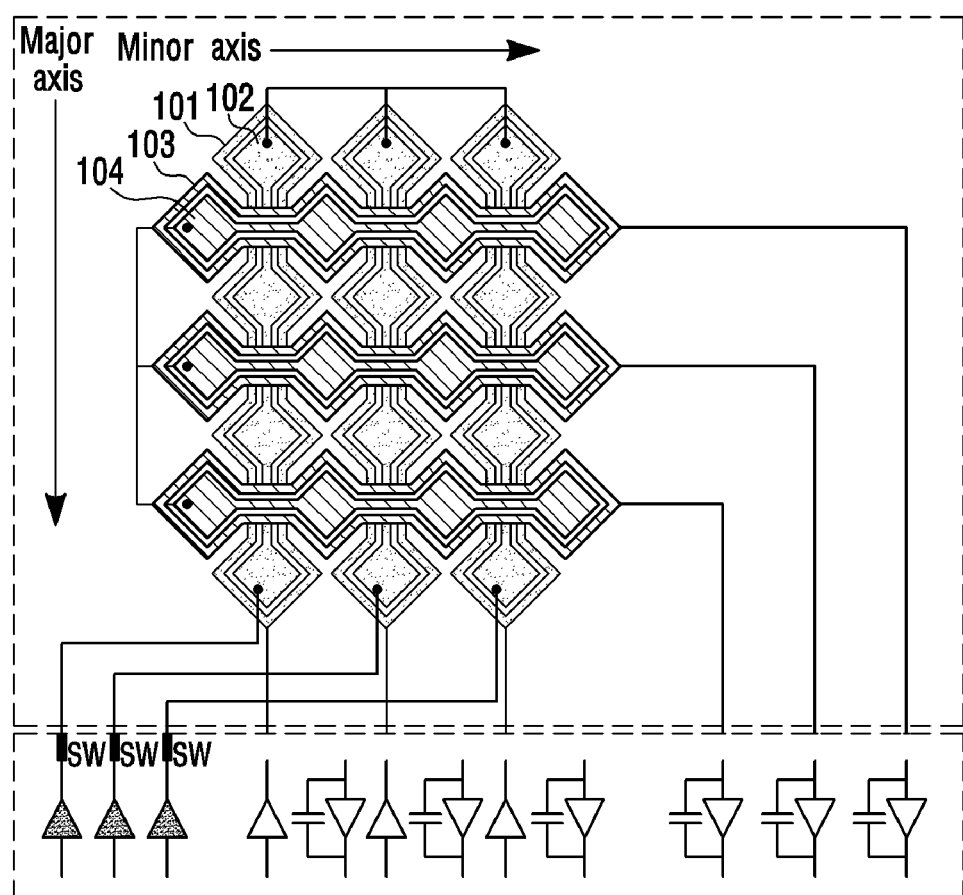
FIG. 6 is a view illustrating a case in which the touch input device in FIG. 4 operates in an antenna driving mode (or stylus driving mode, or stylus uplink mode).
Figure 7:
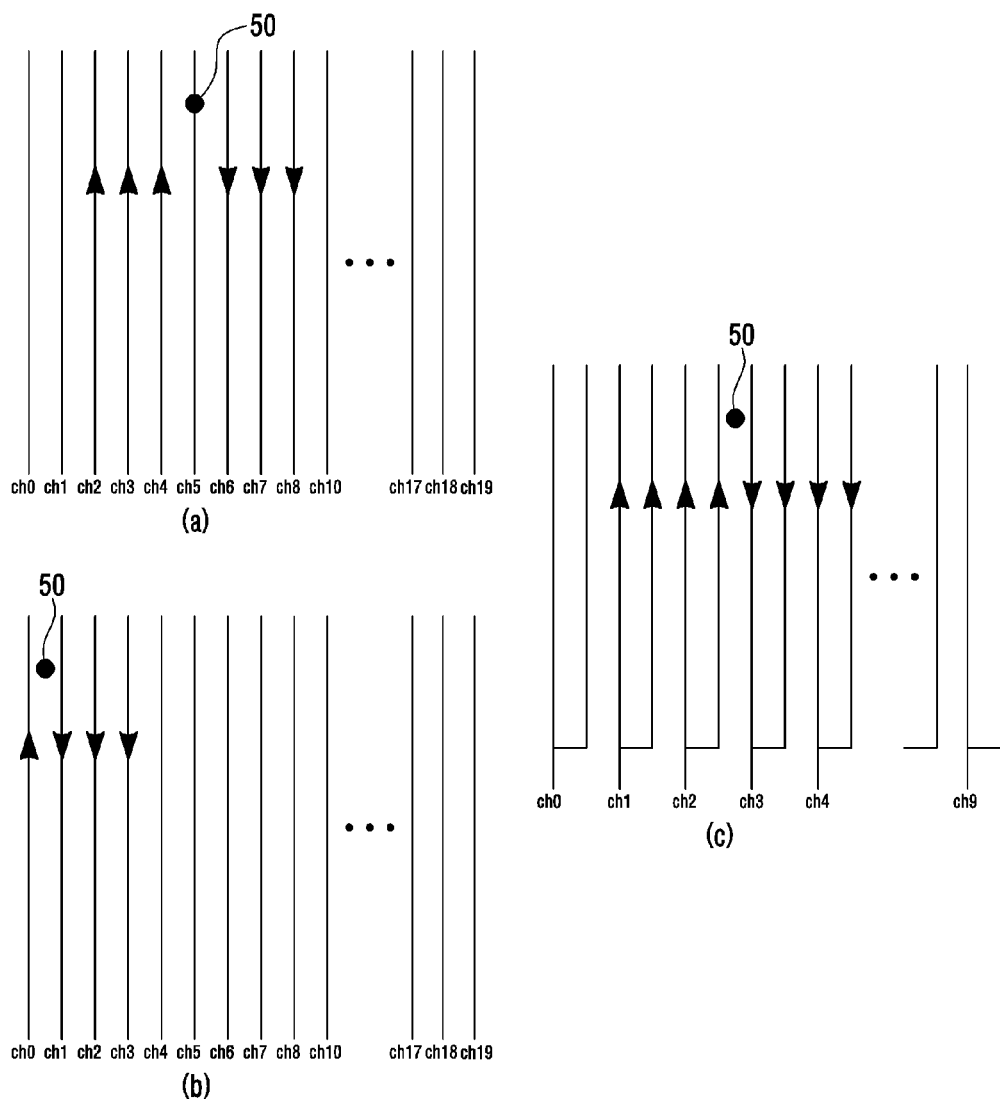

(a) to (c) of FIG. 7 are views for explaining various methods by which a control unit 500 applies a pen driving signal for driving a stylus pen to a plurality of second patterns 102 in FIG. 6.

Figure 1:
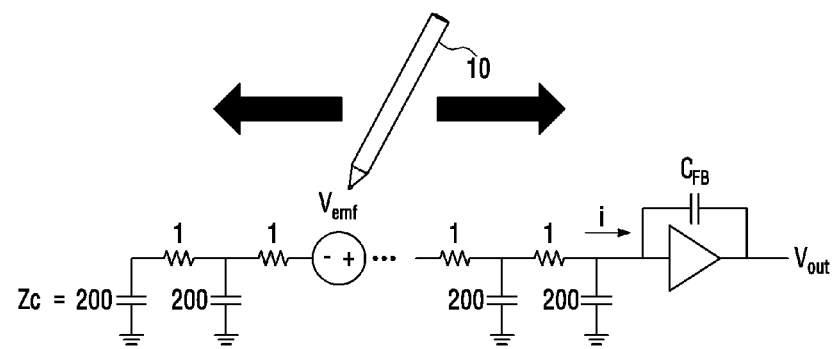
FIG. 1 is a schematic view for explaining that output voltages Vout1 and Vout2 of a capacitor voltage amplitude (CVA) are varied according to a position of a stylus pen 10 on a typical flexible display panel.
Figure 2:
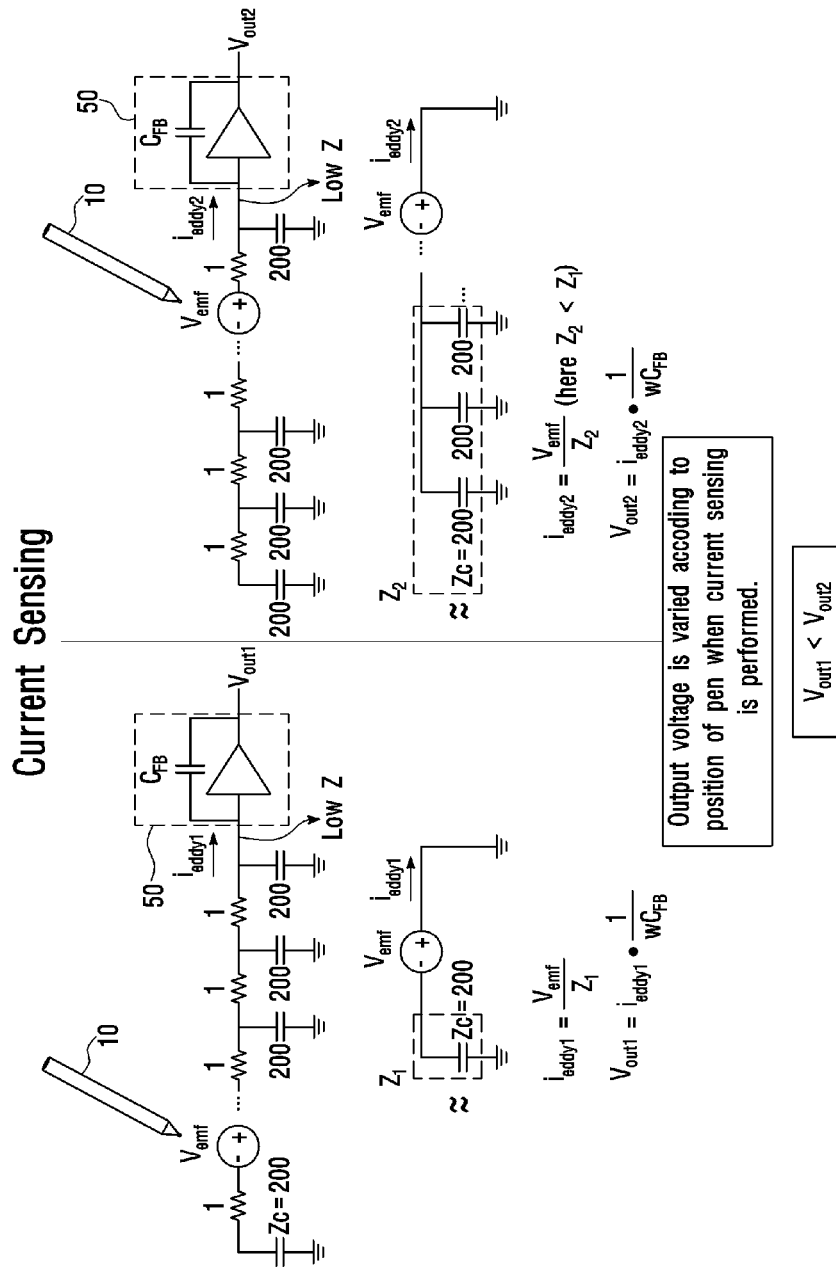
FIG. 2 is a view for explaining through current sensing that output voltages Vout1 and Vout2 of the CVA are varied according to the position of the stylus pen 10 in FIG. 1.
Figure 3:
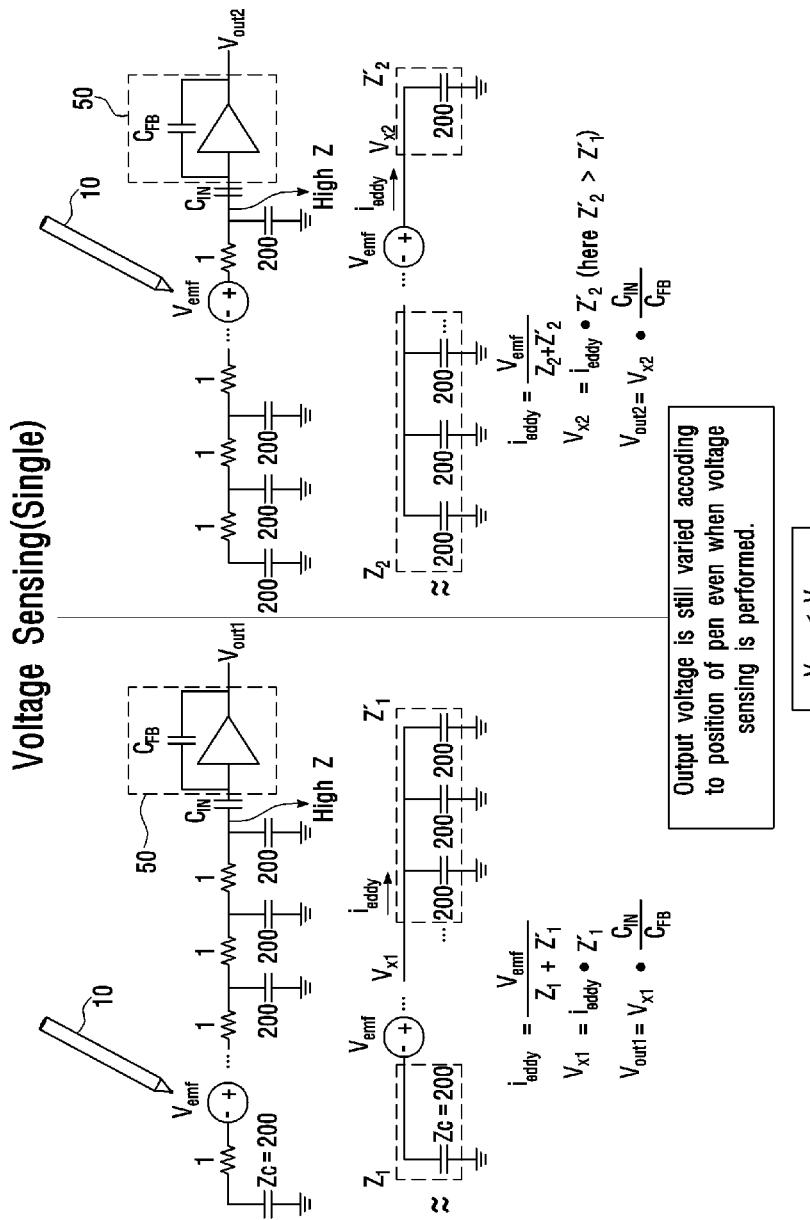
FIG. 3 is a view for explaining through voltage sensing that the output voltages Vout1 and Vout2 of the CVA are varied according to the position of the stylus pen 10 in FIG. 1.
Figure 4:
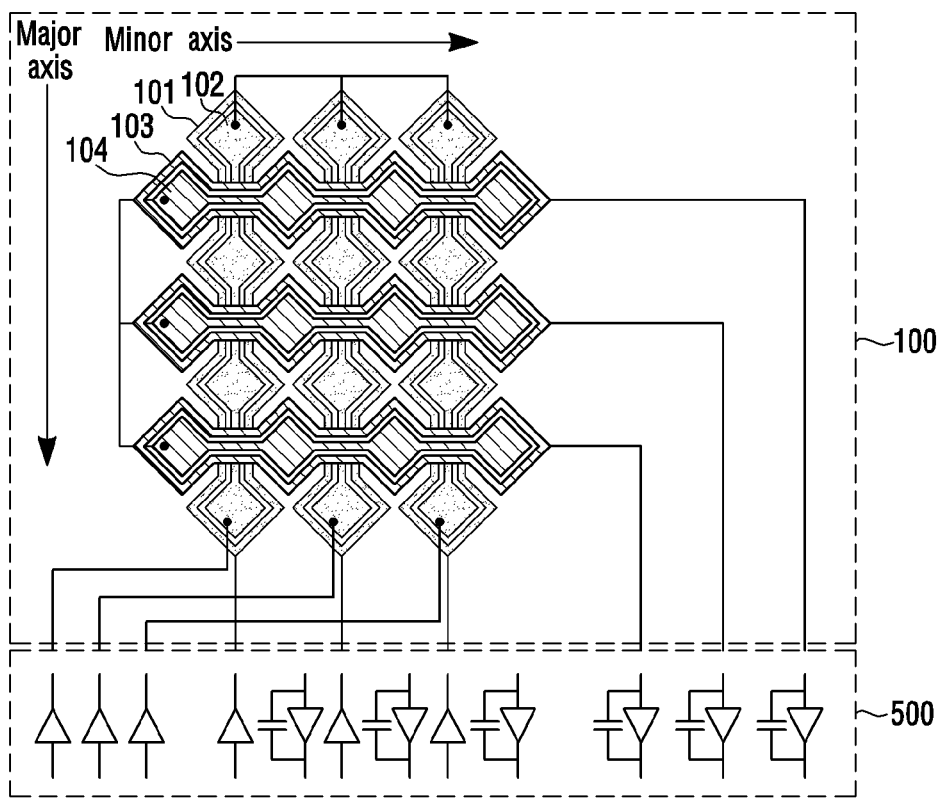
FIG. 4 is a schematic view illustrating a touch input device according to an embodiment of the present invention.
Figure 8:
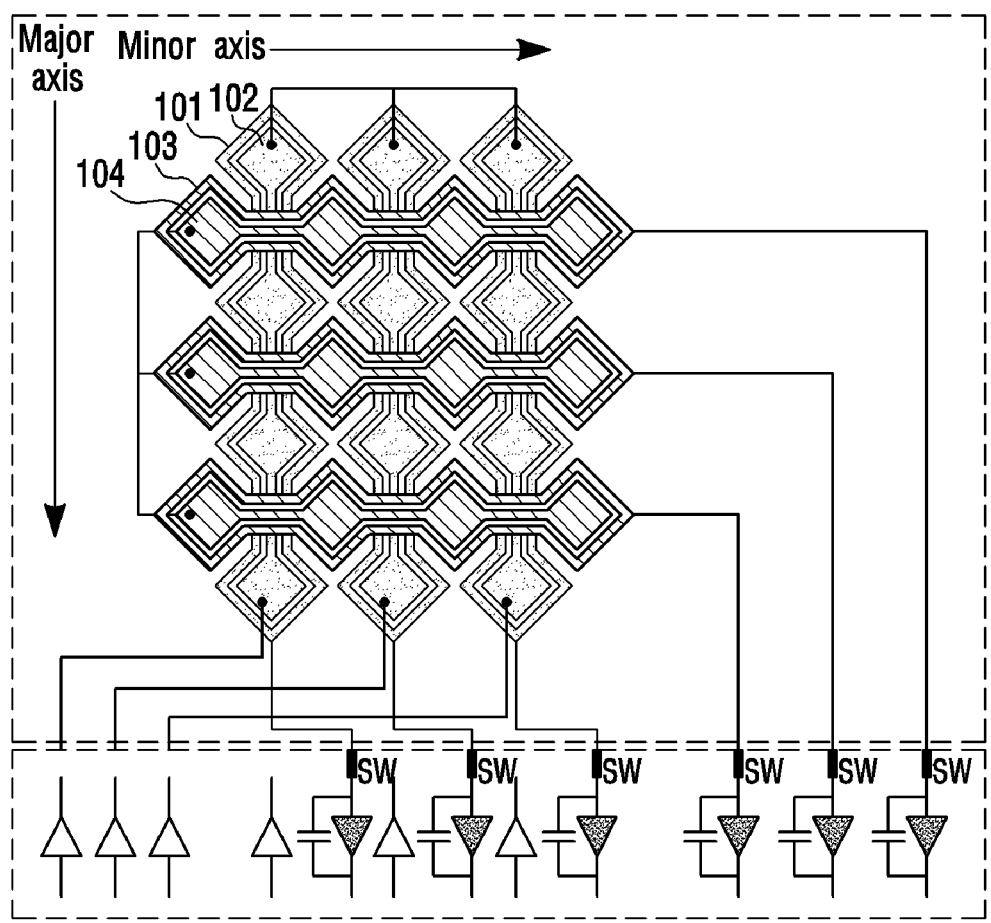

FIG. 8 is a view illustrating a case in which the touch input device in FIG. 4 operates in a stylus sensing mode (or stylus downlink mode).

Figure 9:
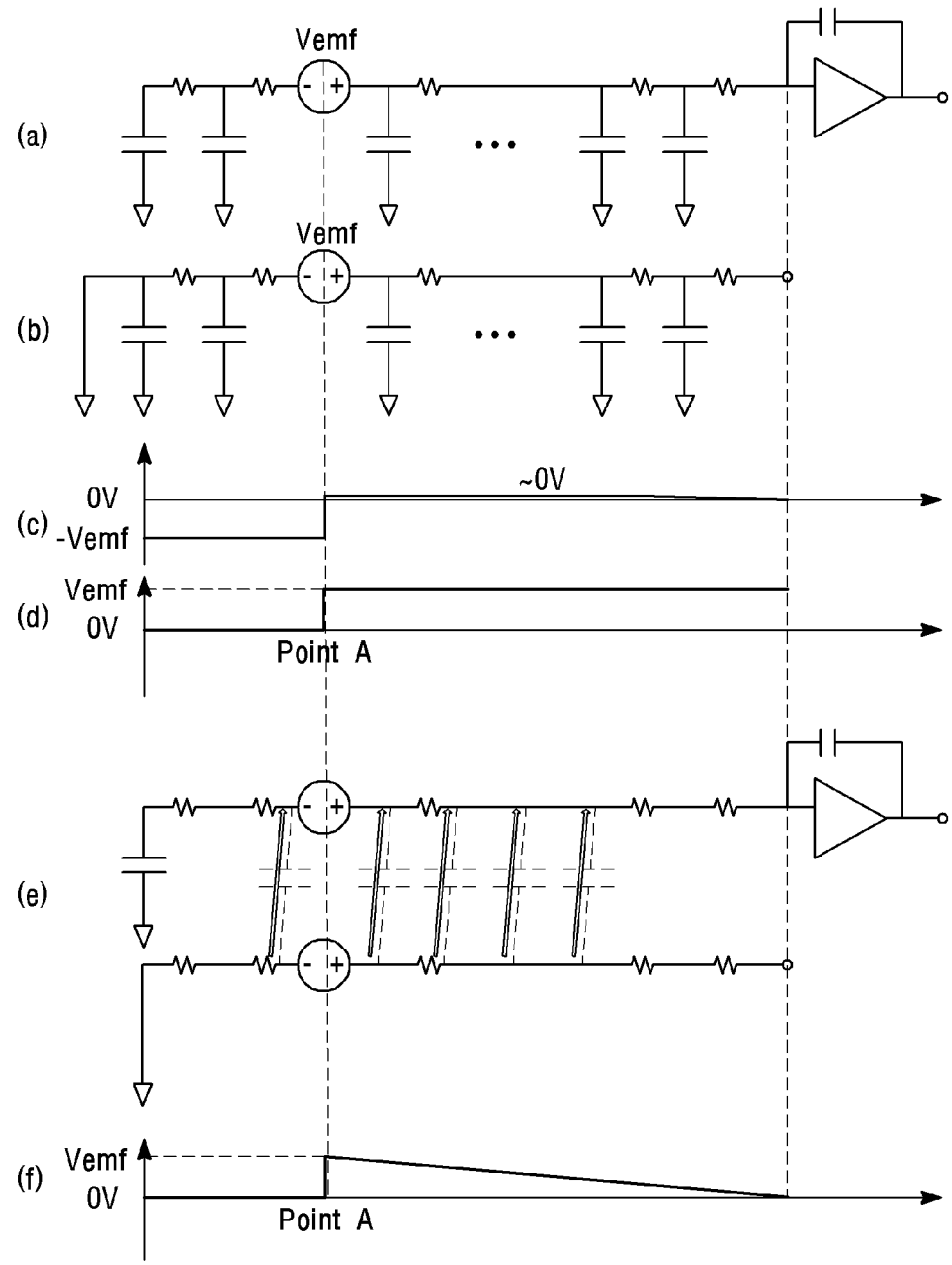

(a) to (f) of FIG. 9 are schematic views for explaining an operation principle of the stylus sensing mode of FIG. 8.

Figure 10:
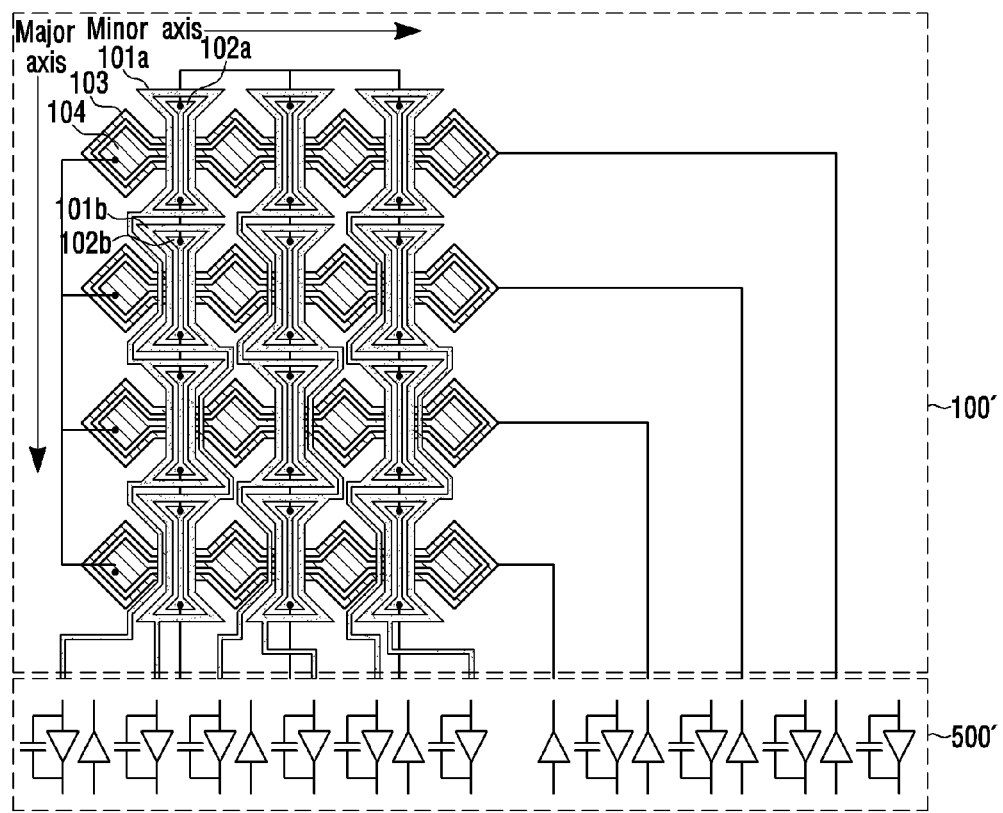

FIG. 10 is a schematic view illustrating a touch input device according to another embodiment of the present invention.

Figure 11:
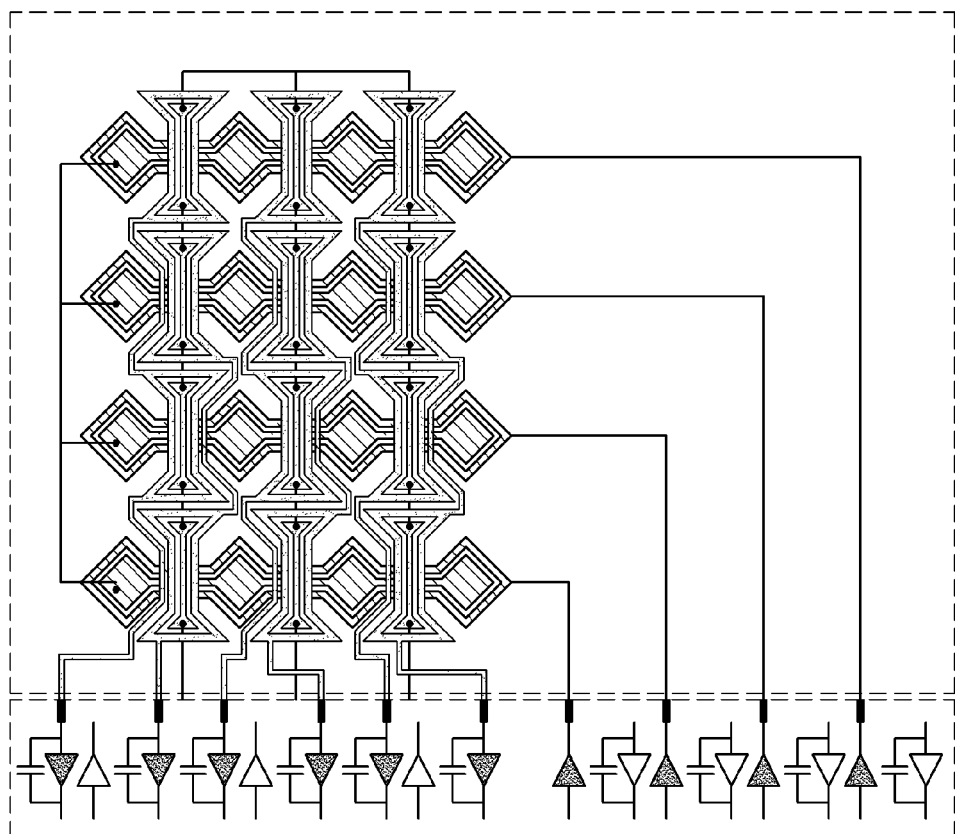

FIG. 11 is a view illustrating a case in which the touch input device in FIG. 10 operates in the touch sensing mode (or 2D sensing mode).

Figure 12:
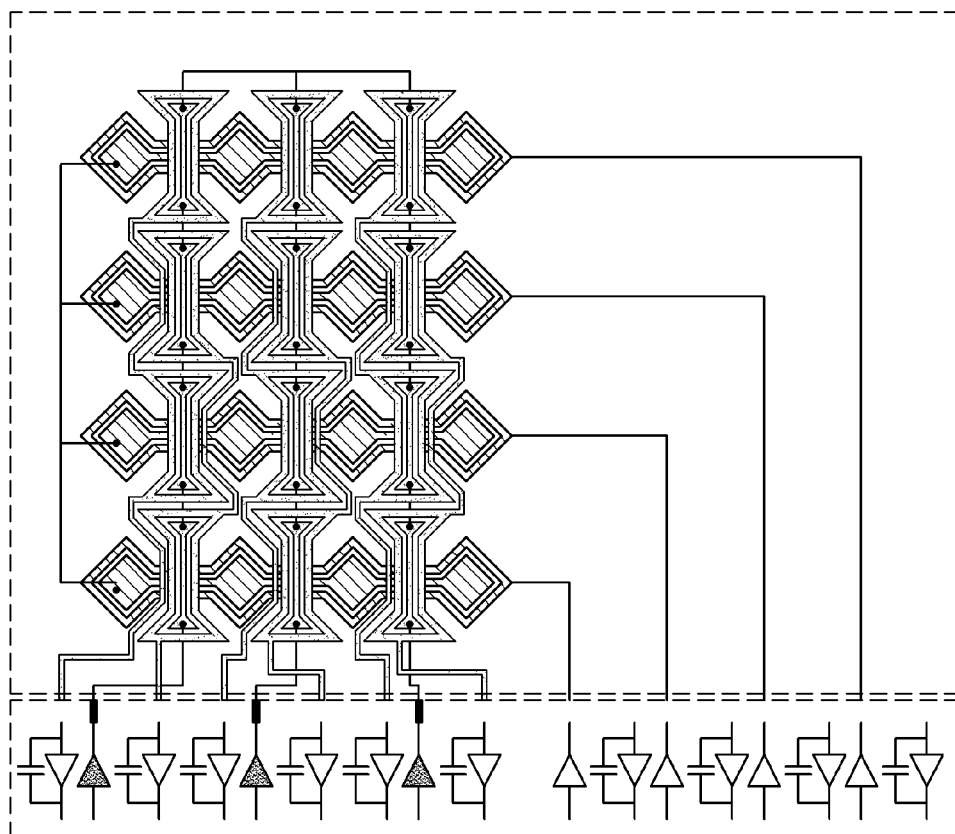

FIG. 12 is a view illustrating a case in which the touch input device in FIG. 10 operates in the antenna driving mode (or stylus driving mode, or stylus uplink mode).

Figure 13:
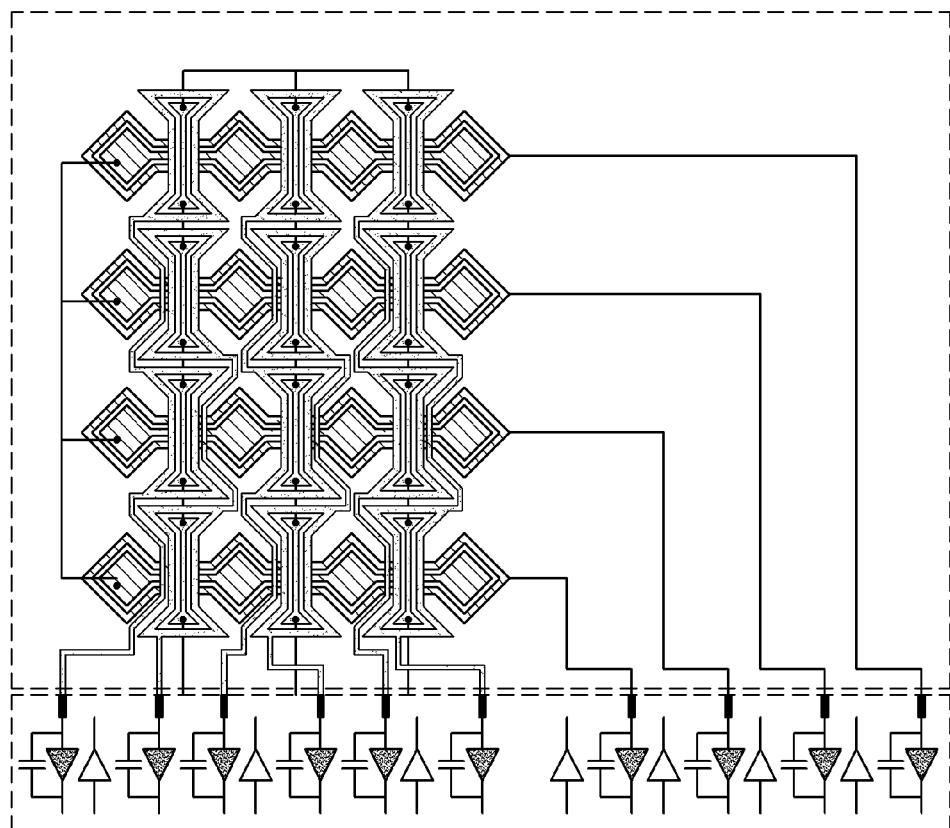

FIG. 13 is a view illustrating a case in which the touch input device in FIG. 10 operates in the stylus sensing mode (or stylus downlink mode).

Figure 14:
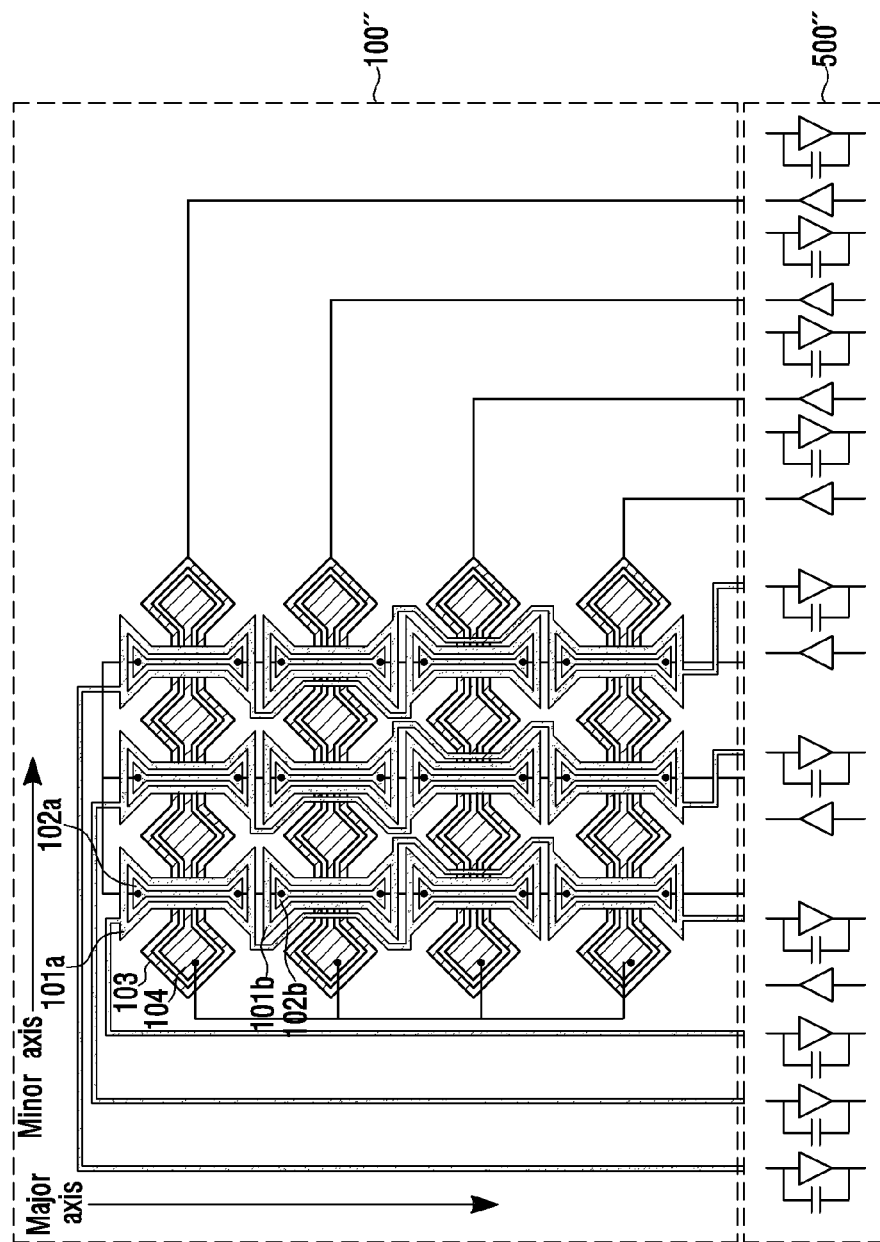

FIG. 14 is a schematic view illustrating a touch input device according to another embodiment of the present invention.

Figure 15:
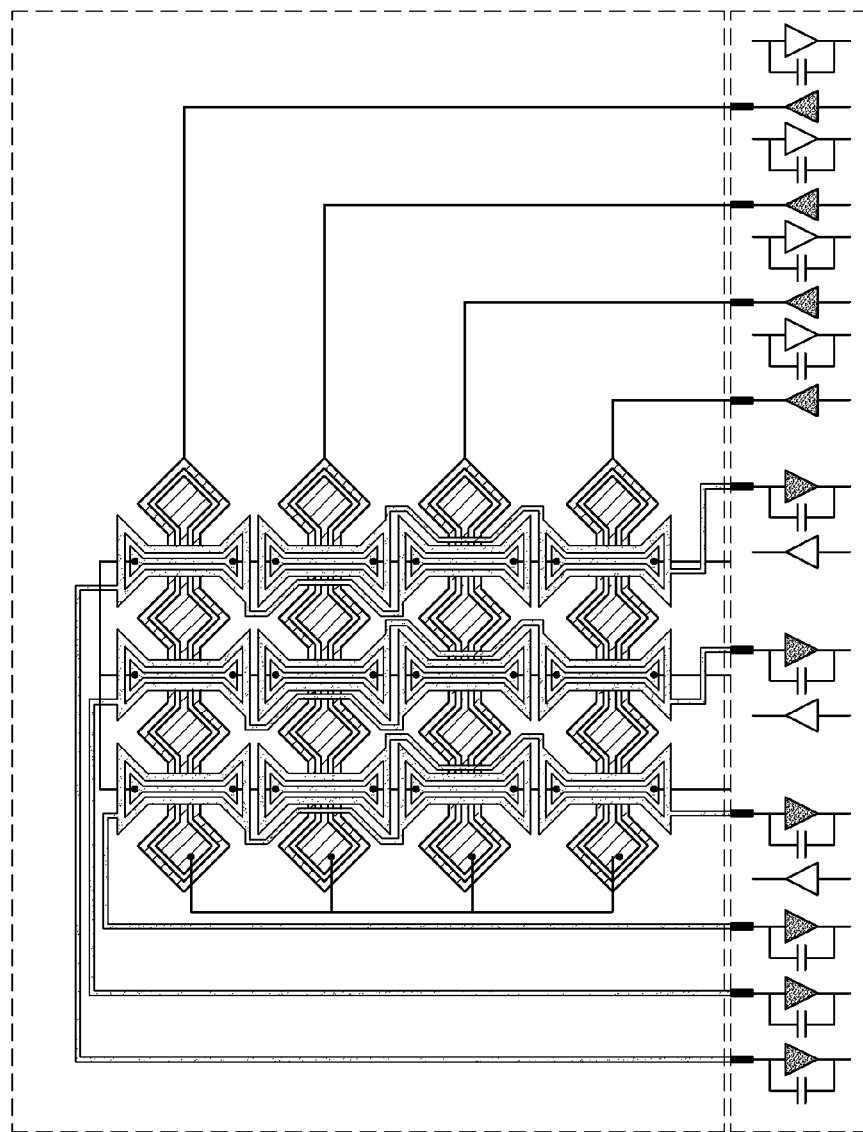

FIG. 15 is a view illustrating a case in which the touch input device in FIG. 14 operates in the touch sensing mode (or 2D sensing mode).

Figure 16:
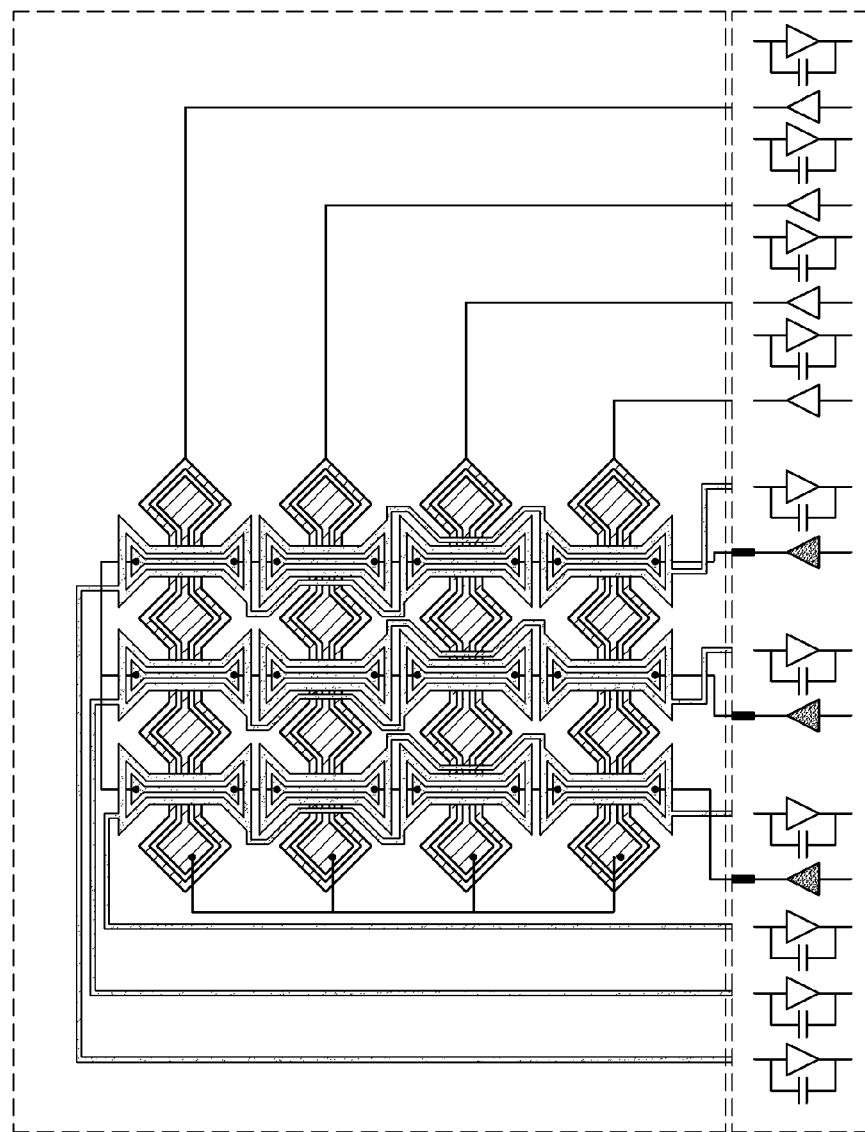

FIG. 16 is a view illustrating a case in which the touch input device in FIG. 14 operates in the antenna driving mode (or stylus driving mode, or stylus uplink mode).

Figure 17:
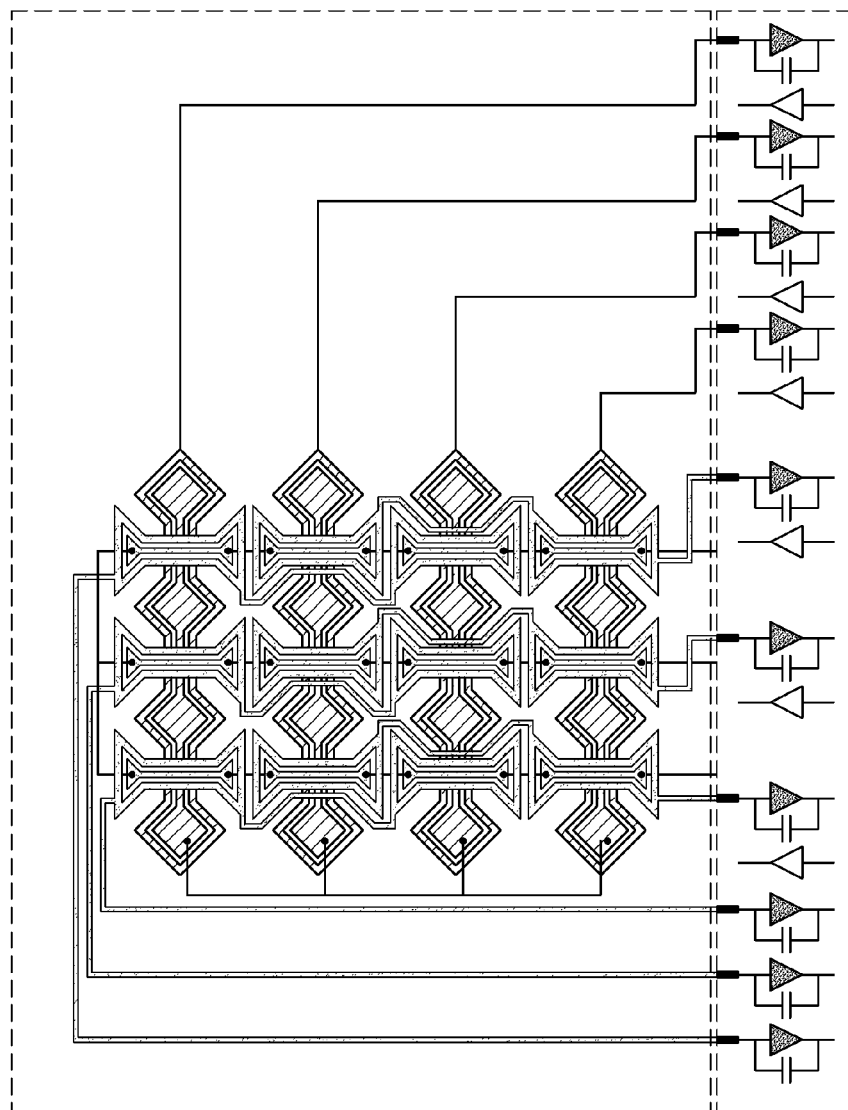

FIG. 17 is a view illustrating a case in which the touch input device in FIG. 14 operates in the stylus sensing mode (or stylus downlink mode).

FIG. 18 is a table showing characteristics of various embodiments in FIGS. 4, 10, and 14.

Figure 19:
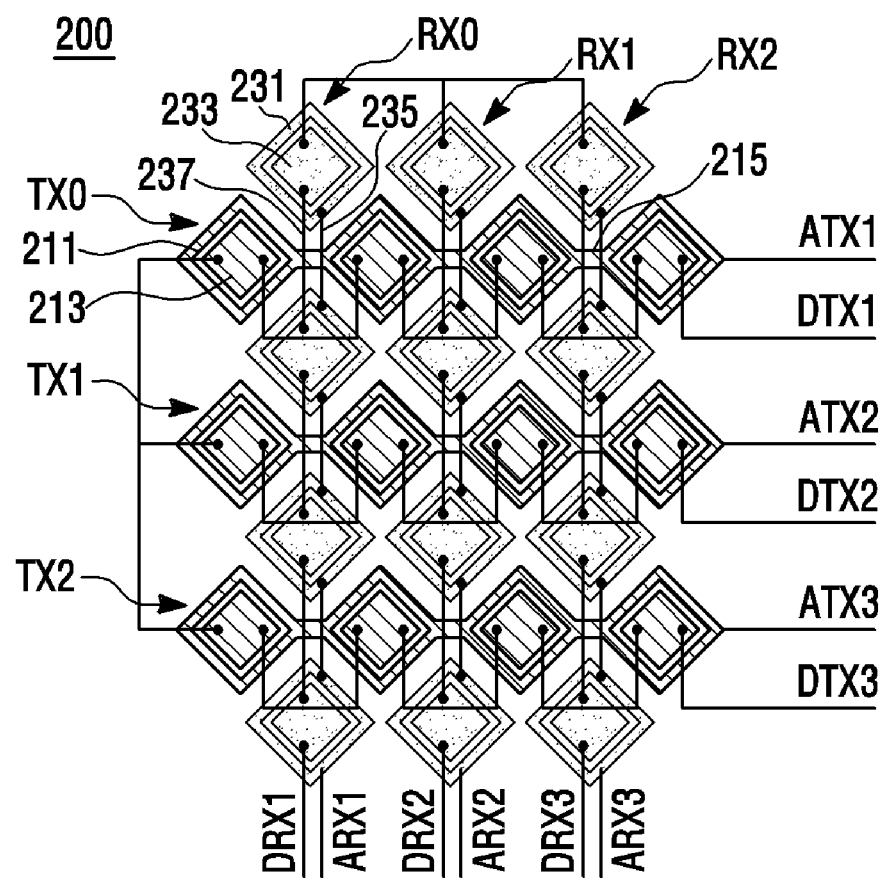

FIG. 19 is a partial plan view illustrating a sensor unit 200 according to another embodiment, which may replace a sensor unit 100 of FIG. 4.

Figure 20:
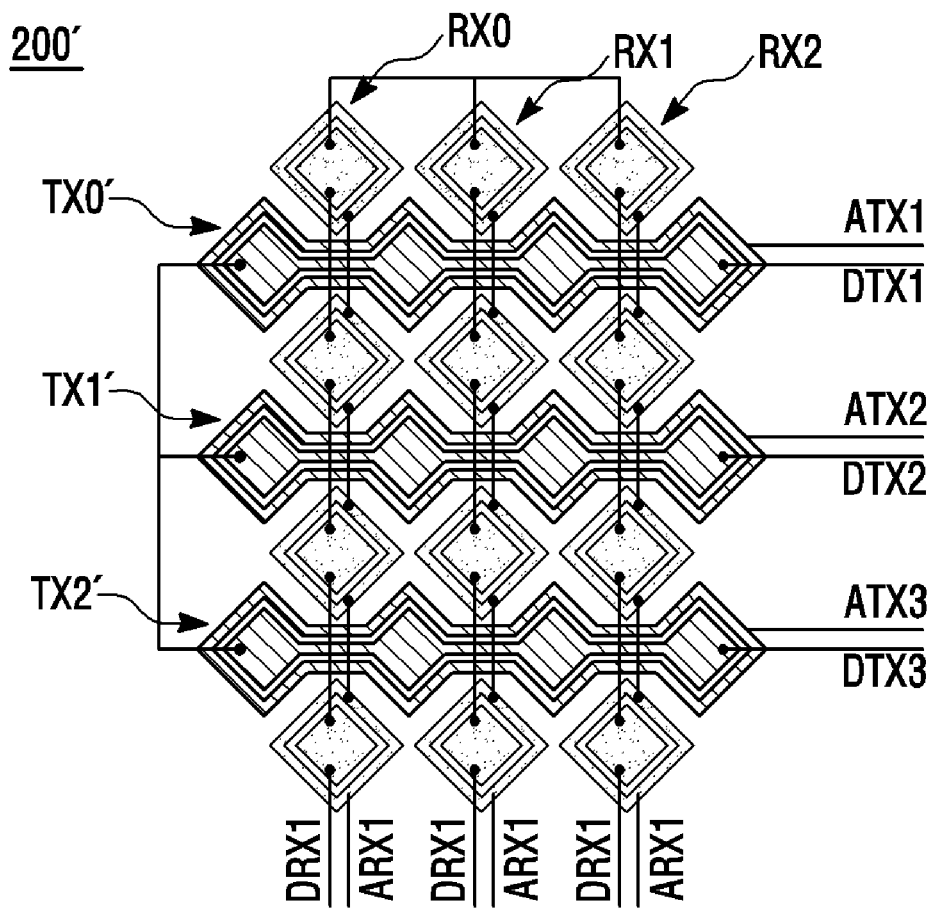

FIG. 20 is a partial plan view of a sensor unit 200' according to another embodiment, which may replace the sensor unit 100 of FIG. 4.

Figure 21:
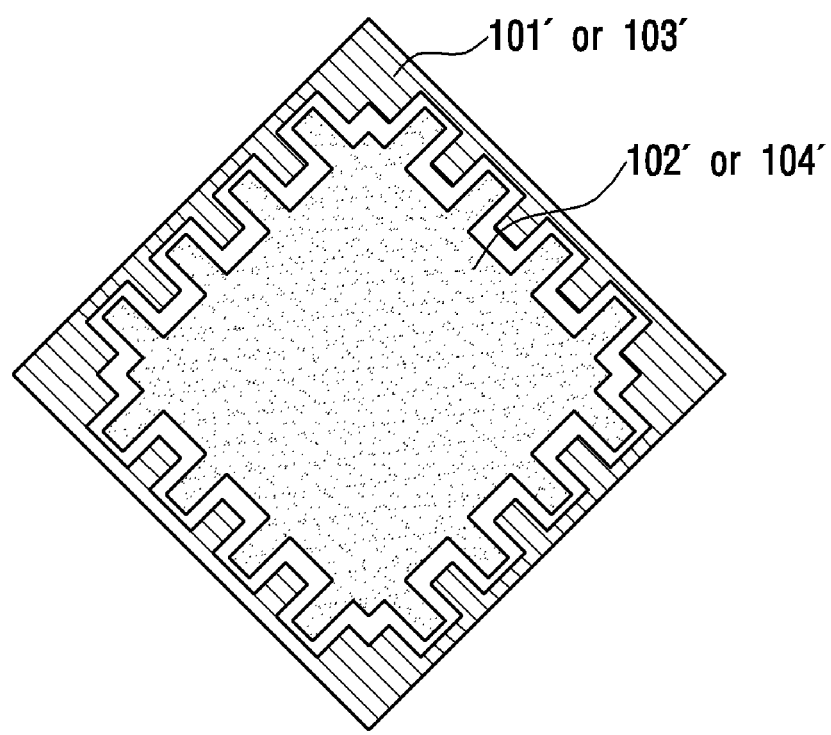

FIG. 21 is a view illustrating another modified example of the sensor unit 100 in FIG. 4.

Figure 22:
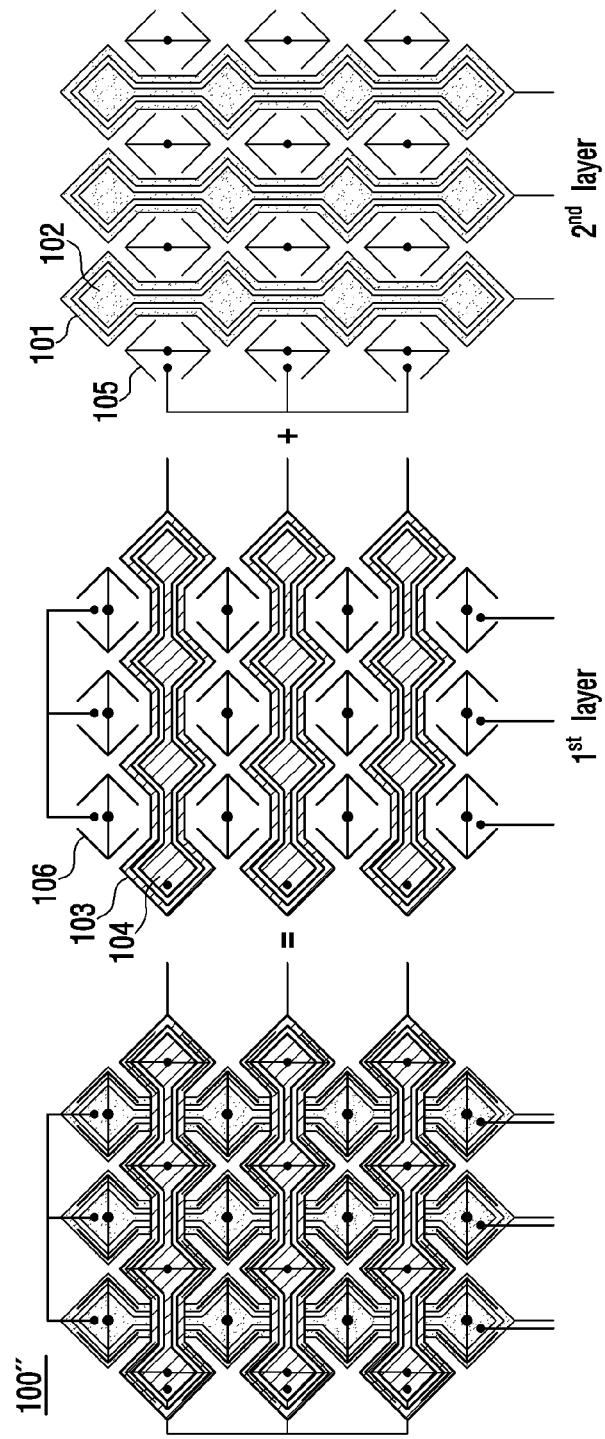

FIG. 22 is a view illustrating another modified example of the sensor unit 100 in FIG. 4.

Figure 23:
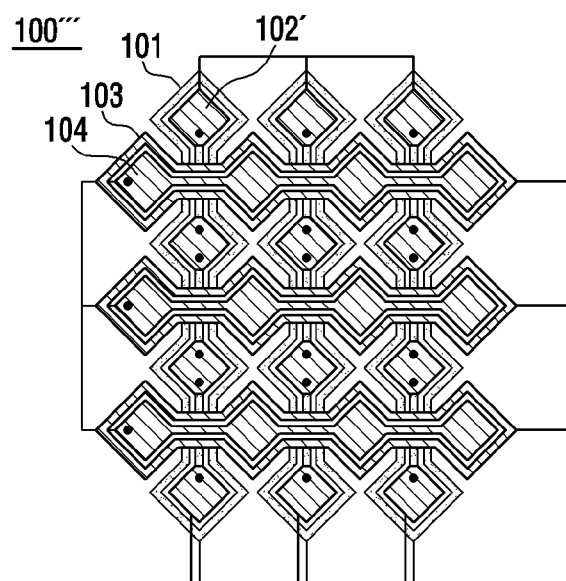

FIG. 23 is a view illustrating another modified example of the sensor unit 100 in FIG. 4.

Figure 24:
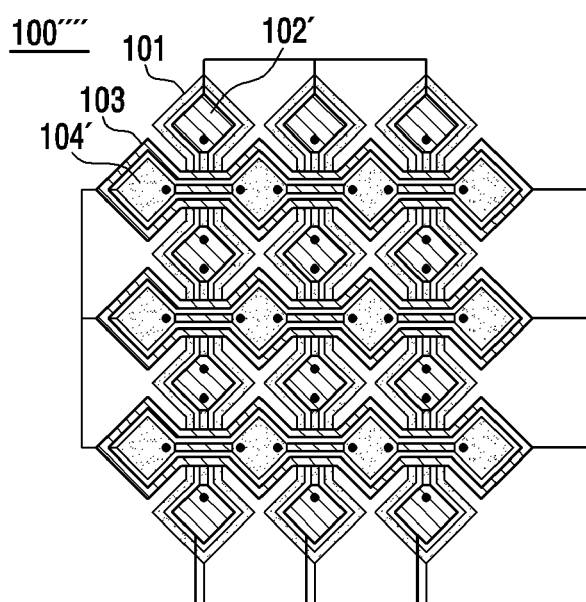

FIG. 24 is a view illustrating another modified example of the sensor unit 100 in FIG. 4.

Figure 25:
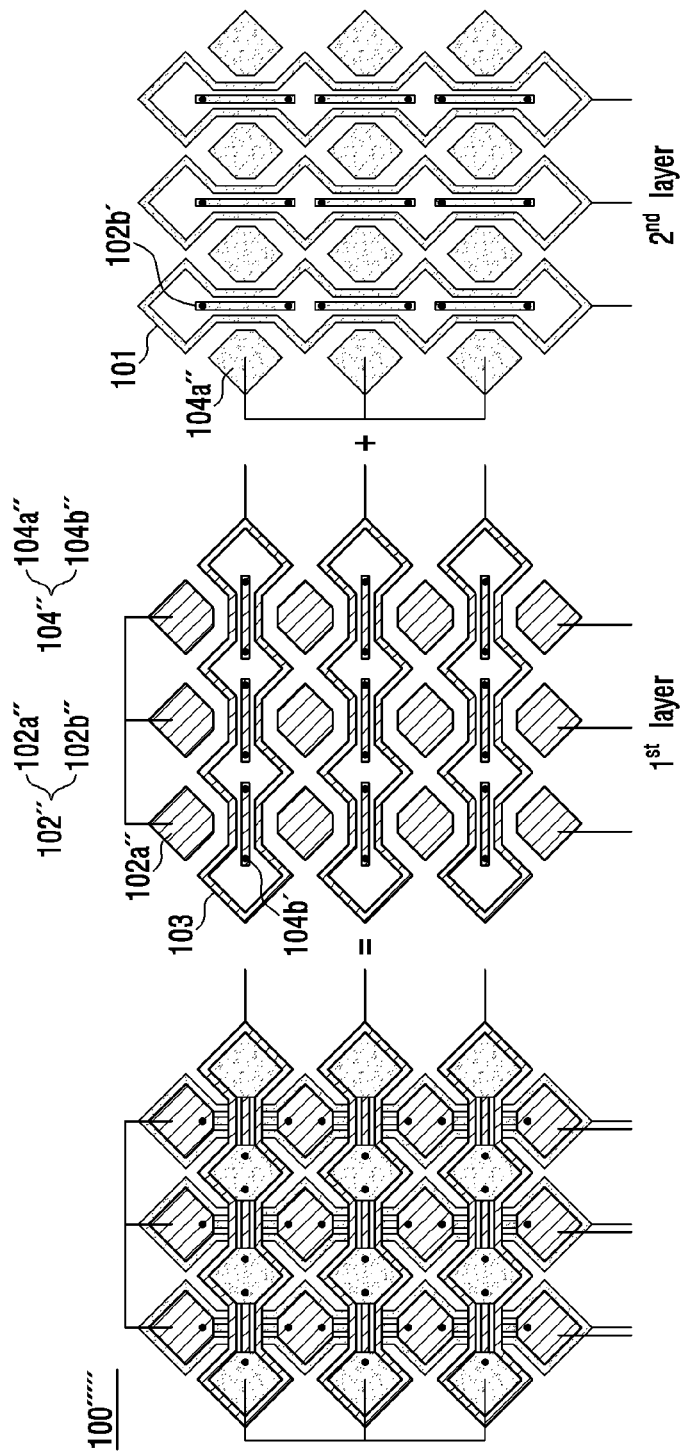

FIG. 25 is a view illustrating another modified example of the sensor unit 100 in FIG. 4.

Figure 26:
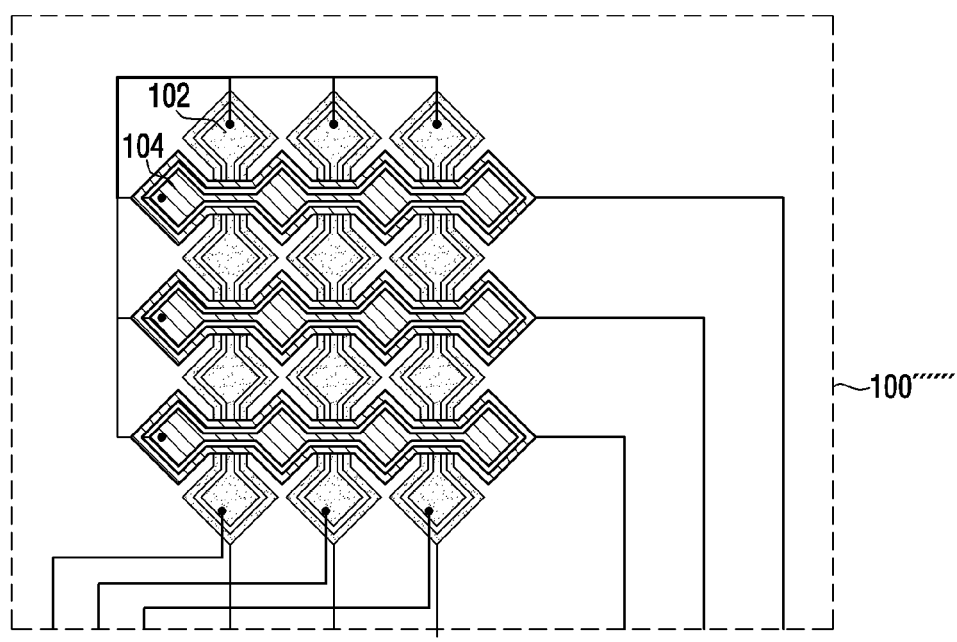

FIG. 26 is a view illustrating another modified example of the sensor unit 100 in FIG. 4.

Figure 27:
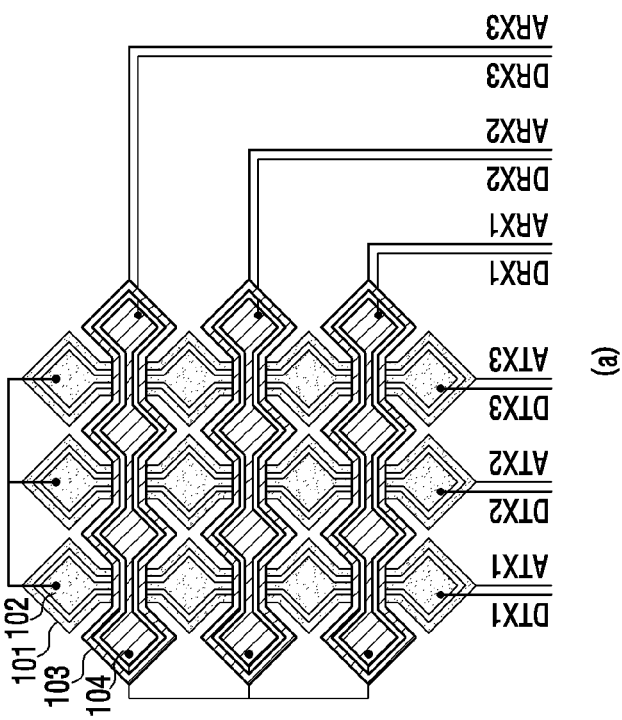

(a) to (c) of FIG. 27 are views for explaining various methods for operating the sensor unit 100 in FIG. 4 in the antenna driving mode (driving) and the stylus sensing mode (receiving).

Figure 28:
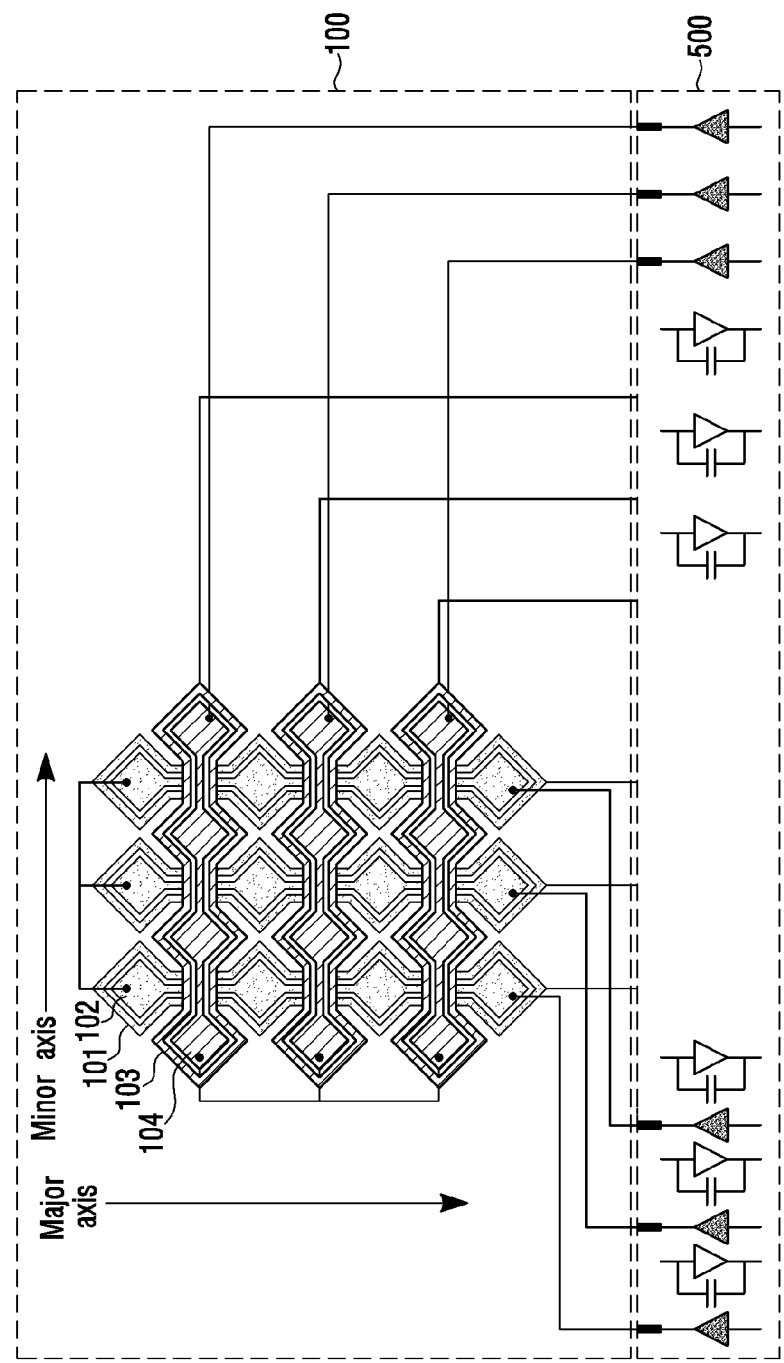

FIG. 28 is a view for explaining another example of operating the sensor unit 100 in FIG. 4 in the antenna driving mode.

Figure 29:
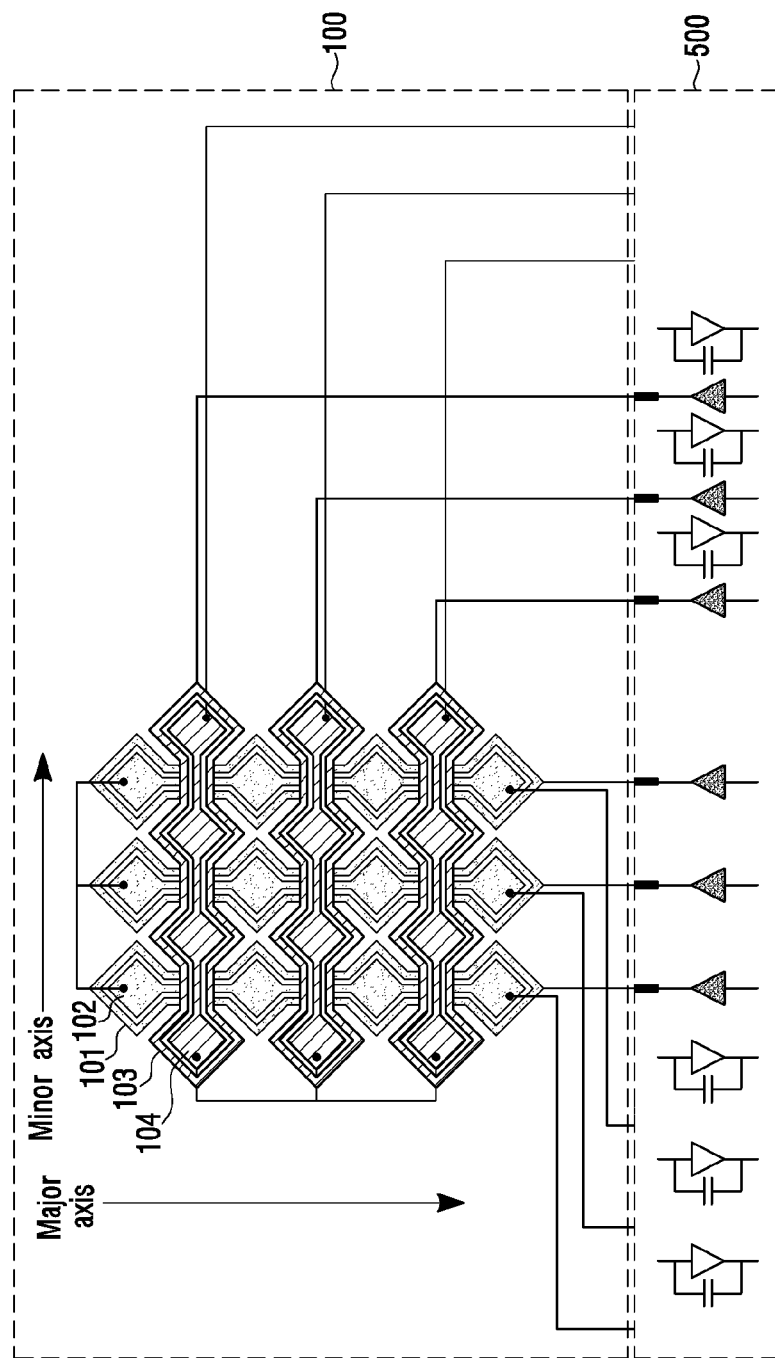

FIG. 29 is a view for explaining another example of operating the sensor unit 100 in FIG. 4 in the antenna driving mode.

Figure 30:
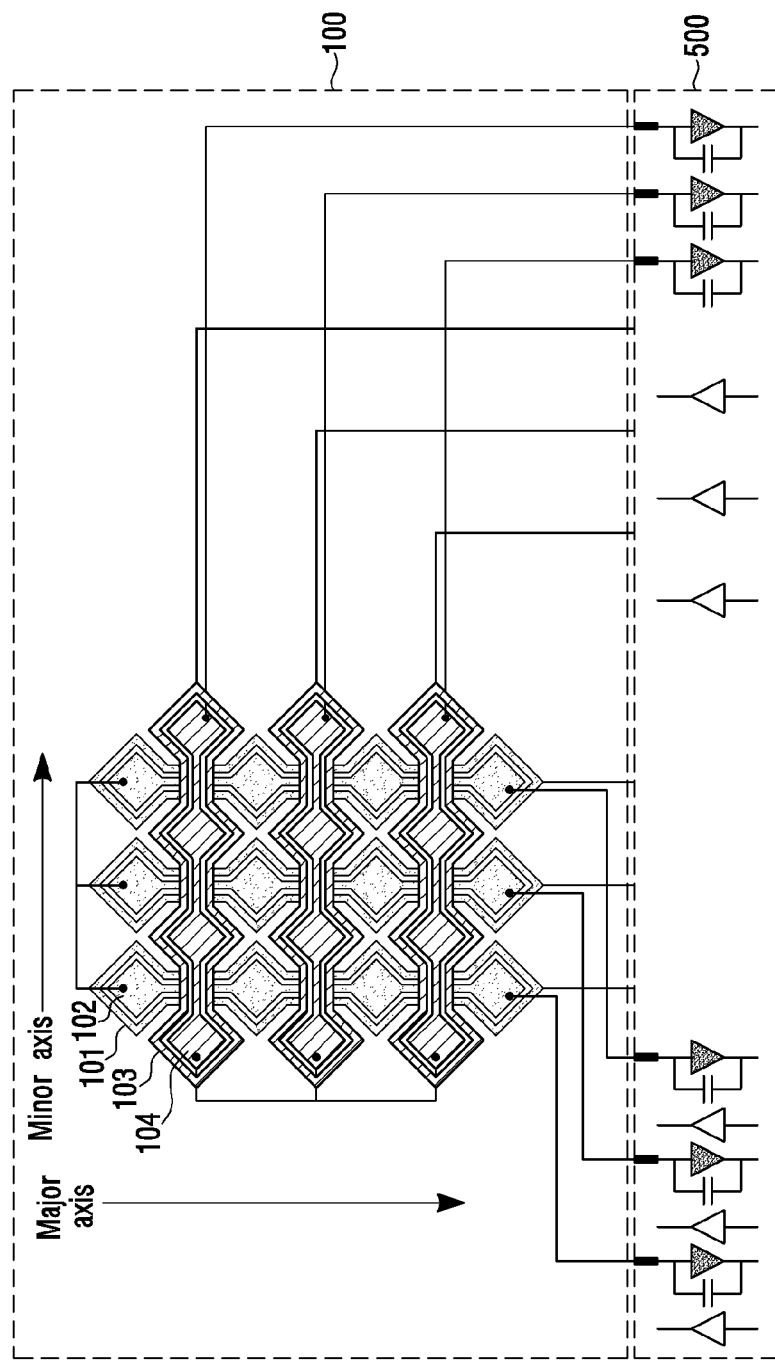

FIG. 30 is a view for explaining another example of operating a sensor unit 100 in FIG. 4 in the stylus sensing mode.

Figure 31:
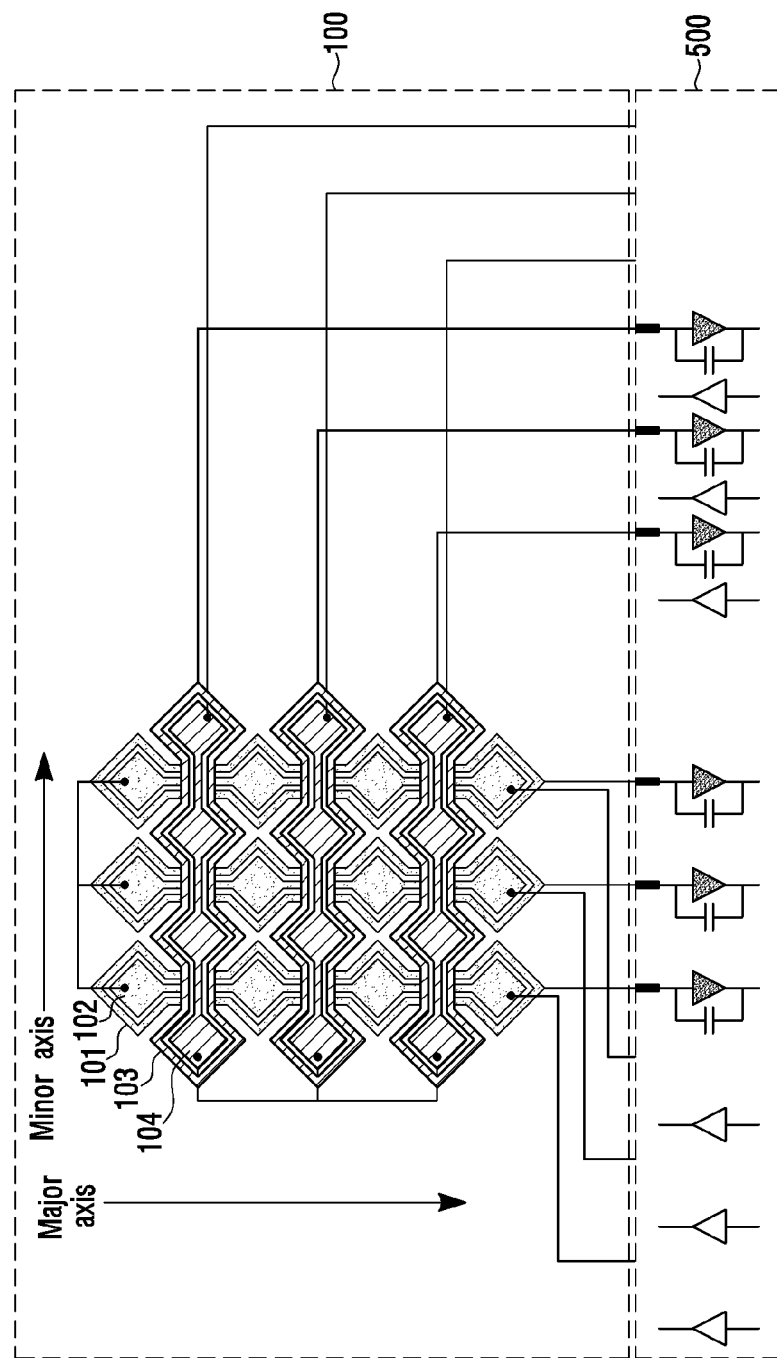

FIG. 31 is a view for explaining another example of operating the sensor unit 100 in FIG. 4 in the stylus sensing mode.

Figure 32:
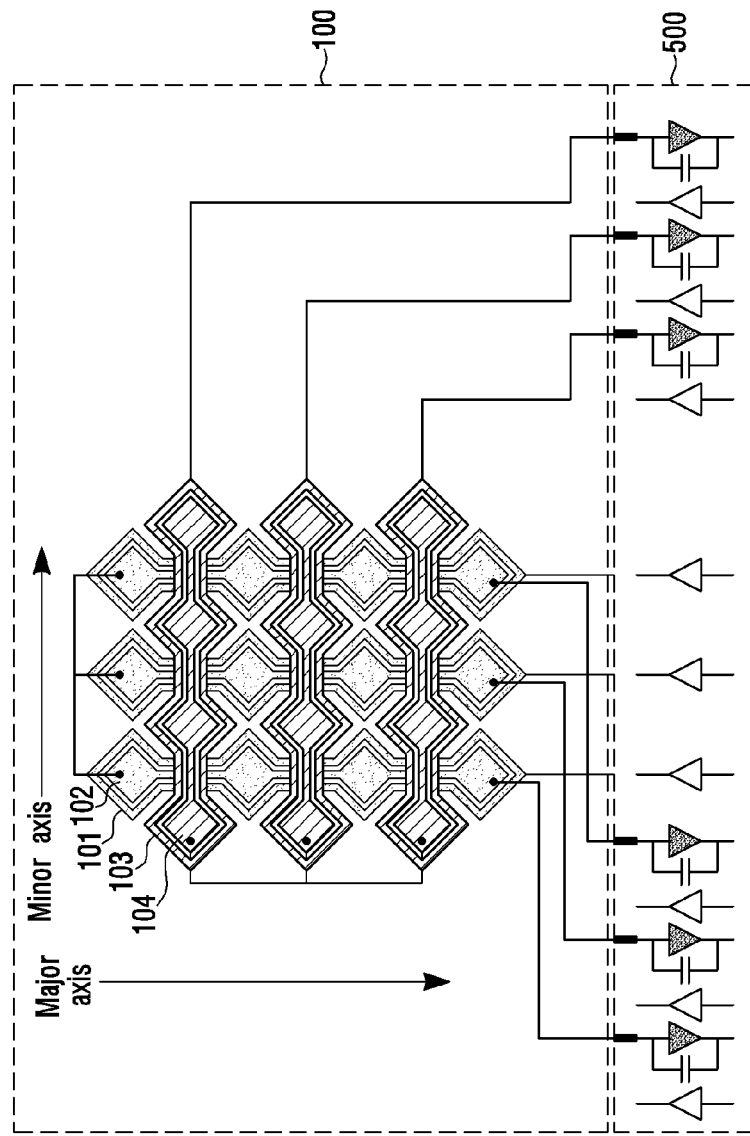

FIG. 32 is a view for explaining another example of operating the sensor unit 100 in FIG. 4 in the stylus sensing mode.

Figure 33:
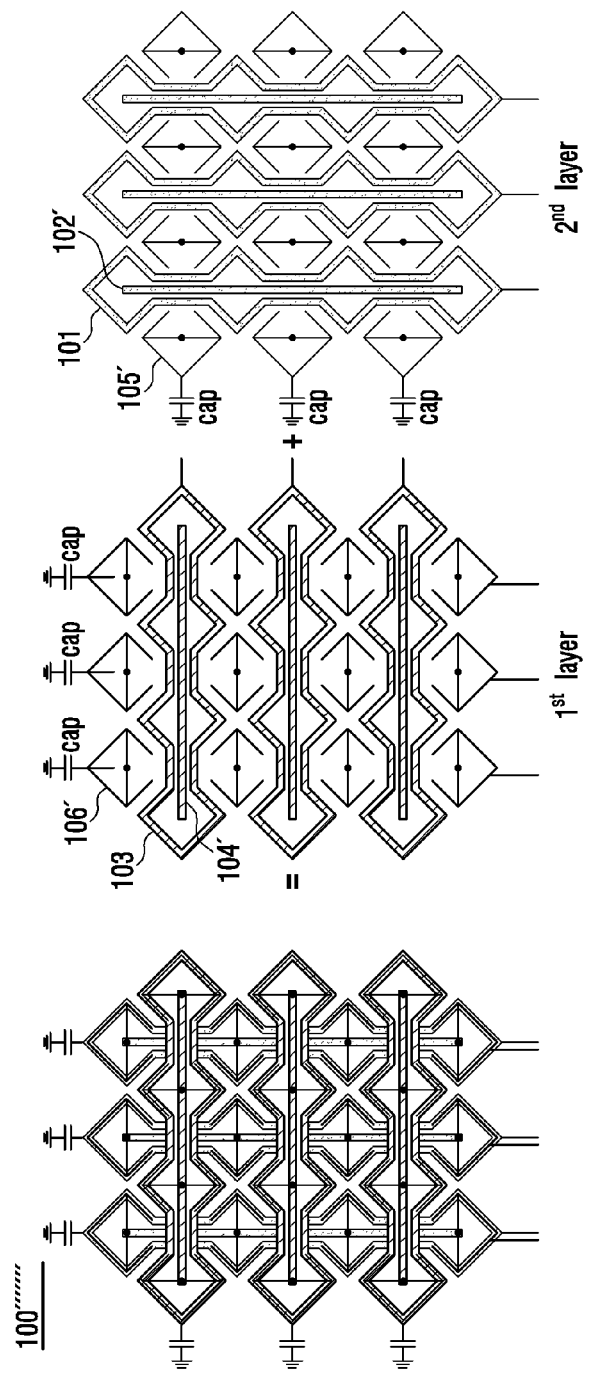

FIG. 33 is a view illustrating another modified example of the sensor unit 100 in FIG. 4.

Figure 34:
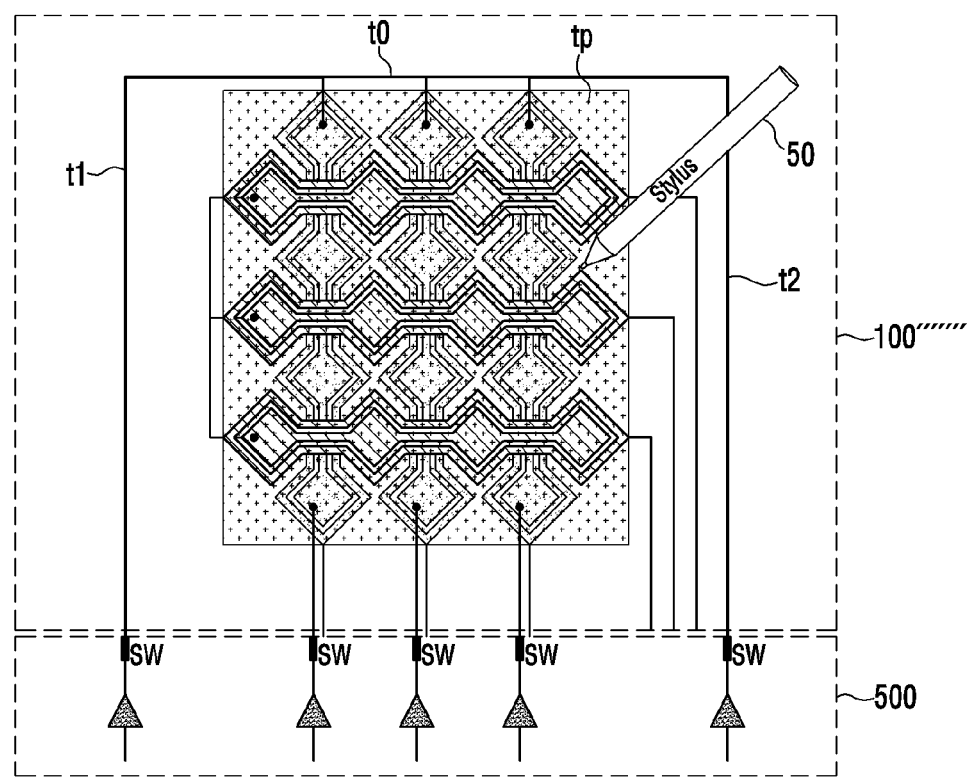

FIG. 34 is a view illustrating another modified example of the sensor unit 100 in FIG. 4.

Figure 35:
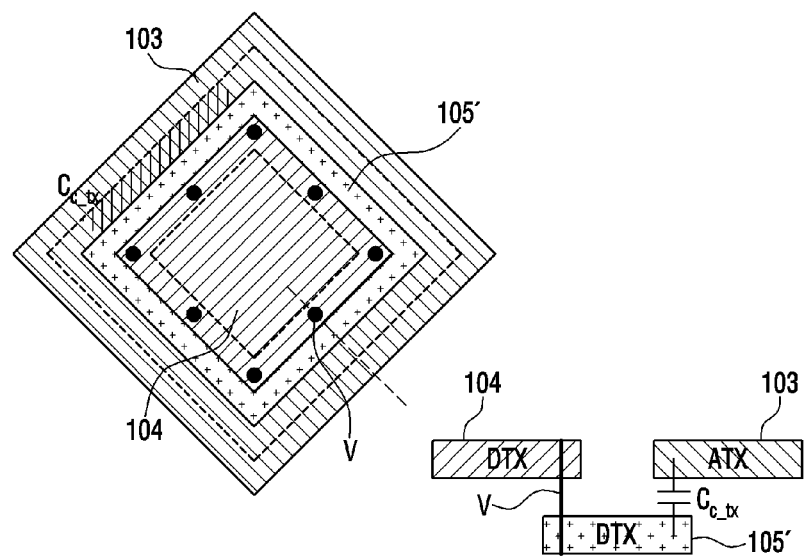

FIG. 35 is a view for explaining a first modified example of a fifth pattern 105 in FIG. 22.

Figure 36:
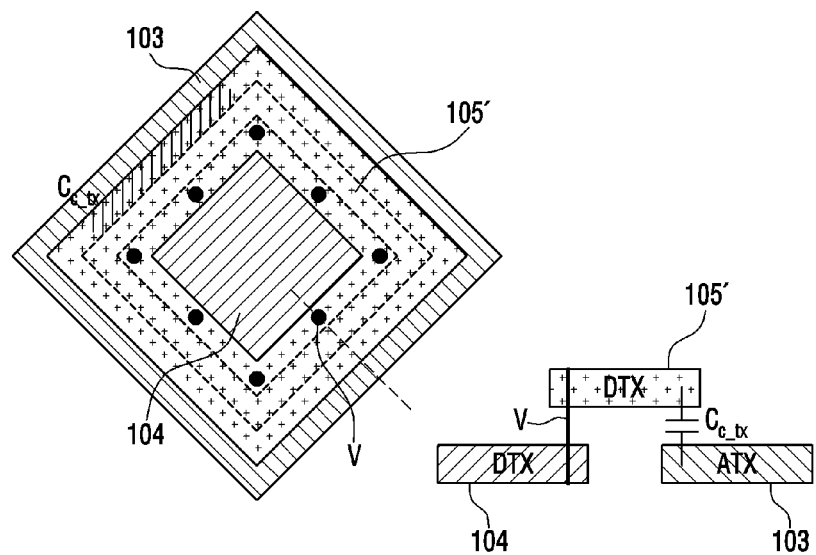

FIG. 36 is a view illustrating a modified example of FIG. 35.

Figure 37:
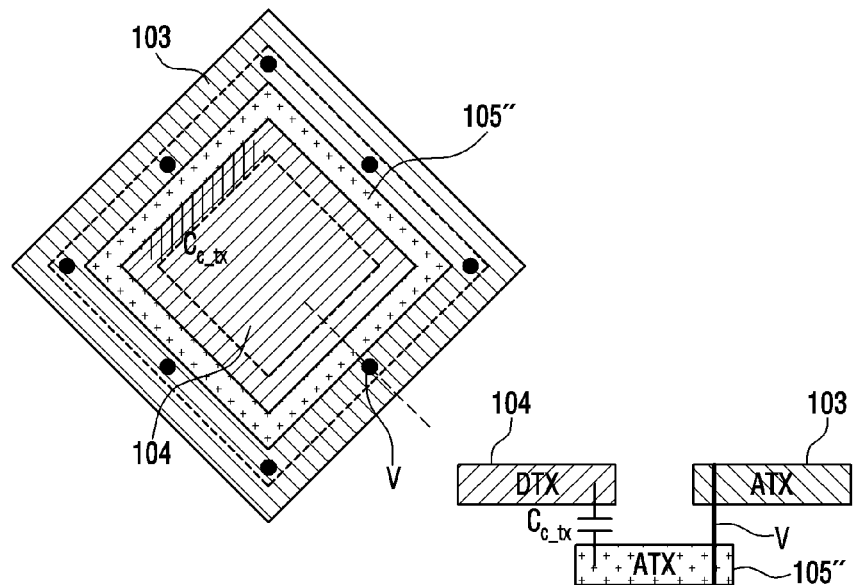

FIG. 37 is a view for explaining a modified example of a fifth pattern 105' in

FIG. 35.

Figure 38:
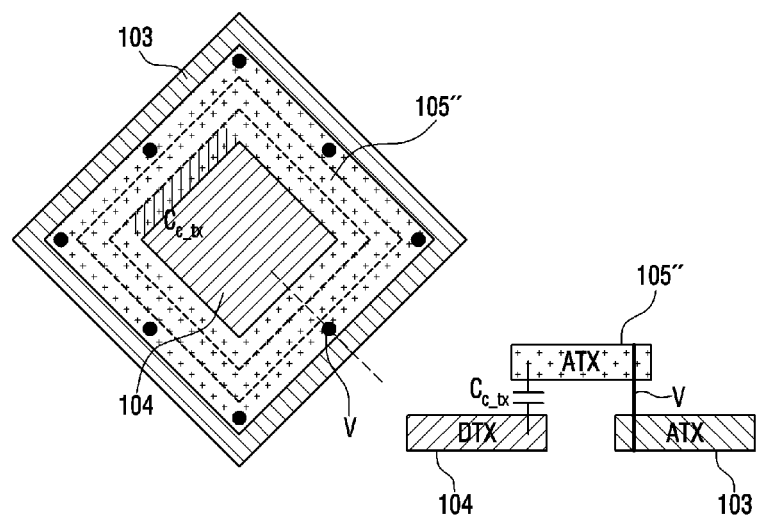

FIG. 38 is a view illustrating a modified example of FIG. 37.

Figure 39:
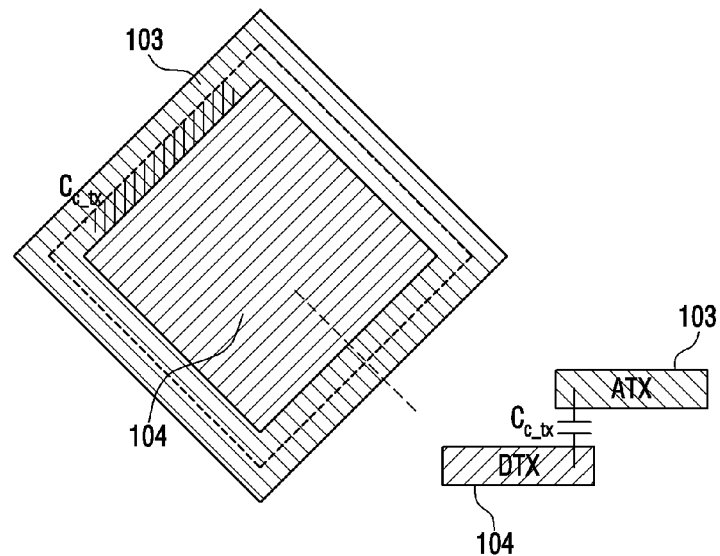
Figure 40:
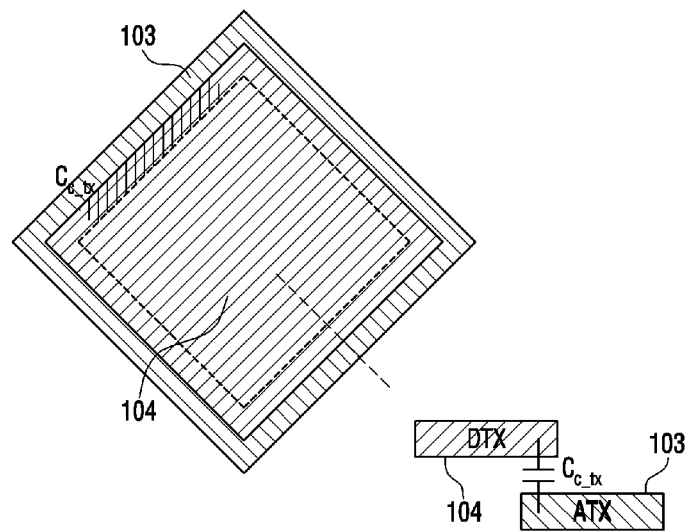

FIGS. 39 and 40 are views for explaining modified examples of a third pattern 103 and a fourth pattern 104 in the sensor unit in FIG. 23 or 24.

MODE FOR CARRYING OUT THE INVENTION

The present disclosure will now be described more fully with reference to the accompanying drawings, in which exemplary embodiments of the present disclosure are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of this specification may include at least one of, e.g., a smartphone, a tablet personal computer, a vehicle display device, a mobile phone, a video phone, an e-book reader, a laptop personal computer, a netbook computer, a mobile medical device, a camera, or a wearable device. Here, the wearable device may include at least one of an accessory device (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable device (e.g., an implantable circuit).

Hereinafter, various embodiments will be described in detail with reference to the accompanying drawings.

FIG. 4 is a schematic view illustrating a touch input device according to an embodiment of the present invention.

Referring to FIG. 4, the touch input device according to an embodiment of the present invention includes a sensor unit 100 and a control unit 500.

The sensor unit 100 includes a plurality of patterns (or a plurality of electrodes).

The sensor unit 100 may include a plurality of first to fourth patterns 101, 102, 103, and 104.

The first pattern 101 has a shape extending in a first direction. Although the first direction is illustrated as a major axis in FIG. 4, the embodiment of the present invention is not limited thereto. For example, the first direction may be a minor axis.

The first pattern 101 may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101 may have an opening in which the second pattern 102 is disposed. The opening may have a shape corresponding to an outer shape of the first pattern 101. The first pattern 101 may have a structure surrounding the second pattern 102. The first pattern 101 is spaced a predetermined distance from the second pattern 102.

The second pattern 102 is disposed in the first pattern 101.

The second pattern 102 may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102 may have a shape corresponding to that of the main pattern part of the first pattern 101, and the connection pattern part of the second pattern 102 may have a shape corresponding to that of the connection pattern part of the first pattern 101.

The plurality of the first patterns 101 and the plurality of second patterns 102 are arranged in parallel to each other.

The plurality of first patterns 101 have one ends electrically connected to the control unit 500 and the other ends that are electrically opened. Here, each of the one ends is relatively close to the control unit 500, and each of the other ends is relatively far from the control unit 500. The one ends of the plurality of first patterns 101 may be electrically connected to the control unit 500 through a conductive trace.

The plurality of second patterns 102 have one ends electrically connected to the control unit 500 and the other ends that are electrically connected to each other through a conductive trace.

Here, each of the one ends is relatively close to the control unit 500, and each of the other ends is relatively far from the control unit 500. Here, when the other ends of the plurality of second patterns 102 are electrically connected to each other, and total impedance is reduced because capacitances for respective second patterns 102 are added. Thus, an effect in which each of the other ends of the plurality of second patterns 102 is AC GND is obtained.

Although not shown in the drawings, the other ends of the plurality of second patterns 102, which are electrically connected to each other, may be grounded.

Also, although not shown in the drawings, the other ends of the plurality of second patterns 102 may not be electrically connected to each other, and a predetermined capacitor may be connected to each of the other ends of the second patterns 102.

The first pattern 101 and the second pattern 102 may be disposed on the same layer. The first pattern 101 and the second pattern 102 may be formed on the same layer by using a metal mesh.

The third pattern 103 has a shape extending in a second direction. Although the second direction is illustrated as a minor axis in FIG. 4, the embodiment of the present invention is not limited thereto. For example, the second direction may be a major axis.

The third pattern 103 may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The third pattern 103 may have an opening in which the fourth pattern 104 is disposed. The opening may have a shape corresponding to an outer shape of the third pattern 103. The third pattern 103 may have a structure surrounding the fourth pattern 104. The third pattern 103 is spaced a predetermined distance from the fourth pattern 104.

The fourth pattern 104 is disposed in the third pattern 103.

The fourth pattern 104 may include a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the fourth pattern 104 may have a shape corresponding to that of the main pattern part of the third pattern 103, and the connection pattern part of the fourth pattern 104 may have a shape corresponding to that of the connection pattern part of the third pattern 103.

A plurality of the third patterns 103 and a plurality of fourth patterns 104 are disposed in parallel to each other.

The plurality of third patterns 103 have one ends electrically connected to the control unit 500 and the other ends that are electrically opened. Here, each of the one ends is relatively close to the control unit 500, and each of the other ends is relatively far from the control unit 500. The one ends of the plurality of third patterns 103 may be electrically connected to the control unit 500 through a conductive trace.

The plurality of fourth patterns 104 have one ends electrically connected to the control unit 500 and the other ends that are electrically connected to each other through a conductive trace. Here, each of the one ends is relatively close to the control unit 500, and each of the other ends is relatively far from the control unit 500. Here, when the other ends of the plurality of fourth patterns 104 are electrically connected to each other, total impedance is reduced because capacitances for respective fourth patterns 104 are added. Thus, an effect in which each of the other ends of the plurality of fourth patterns 104 is AC GND is obtained.

The other ends of the plurality of fourth patterns 104, which are electrically connected to each other, may be grounded.

Also, although not shown in the drawings, the other ends of the plurality of fourth patterns 104 may not be electrically connected to each other, and a predetermined capacitor may be connected to each of the other ends of the fourth patterns 104.

The third pattern 103 and the fourth pattern 104 may be disposed on the same layer. The third pattern 103 and the fourth pattern 104 may be formed on the same layer by using a metal mesh. Here, the third pattern 103 and the fourth pattern 104 may be disposed on a layer different from that of the first pattern 101 and the second pattern 102. For example, the first pattern 101 and the second pattern 102 may be disposed on a first layer, and the third pattern 103 and the fourth pattern 104 may be disposed on a second layer that is different from the first layer.

The control unit 500 may be electrically connected to the sensor unit 100 and control an operation of the sensor unit 100. The control unit 500 and the sensor unit 100 may be electrically connected to each other through a conductive trace.

The control unit 500 may include a plurality of driving circuit units and a plurality of sensing circuit units. The plurality of driving circuit units may include a driving circuit unit for touch sensing and a driving circuit unit for stylus driving. The plurality of sensing circuit units may include a sensing circuit unit for touch sensing and a sensing circuit unit for stylus sensing. Here, some sensing circuit units among the plurality of sensing circuit units may perform touch sensing in addition to stylus sensing.

The control unit 500 may control the sensor unit 100 to operate in one of a touch sensing mode, an antenna driving mode, and a stylus sensing mode. The control unit 500 may connect the plurality of the driving/sensing circuit units to the sensor unit 100 according to each mode and control a driving signal to be applied to the plurality of driving circuit units. To this end, the control unit 500 may include a plurality of switches for electrically connecting the plurality of driving/sensing circuit units and the sensor unit 100.

Hereinafter, each mode will be described with reference to FIGS. 5 to 7.

Figure 5:
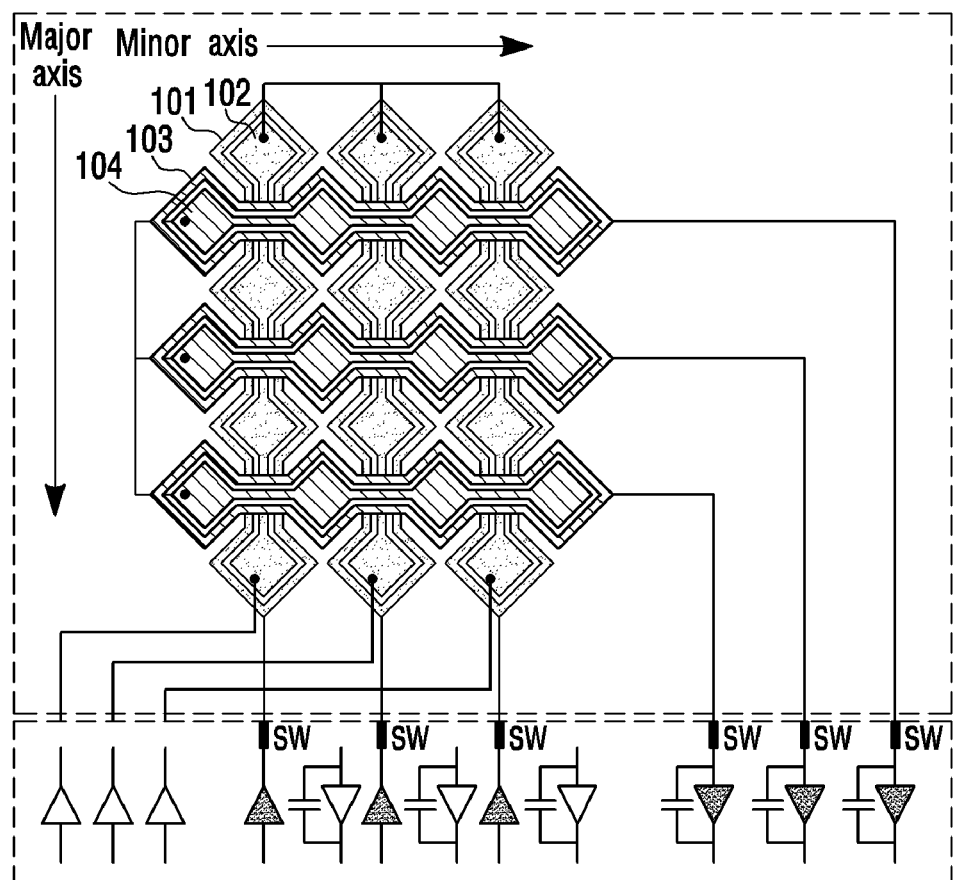
FIG. 5 is a view illustrating a case in which the touch input device in FIG. 4 operates in a touch sensing mode (or 2D sensing mode).

FIG. 5 is a view illustrating a case in which the touch input device in FIG. 4 operates in the touch sensing mode (or 2D sensing mode).

Referring to FIGS. 4 and 5, in case of the touch sensing mode, the control unit 500 may electrically connect the plurality of driving circuit units for touch sensing to the first pattern 101 of the sensor unit 100. The control unit 500 may control a plurality of switches sw to electrically connect the conductive traces connected to the plurality of first patterns 101 to the plurality of driving circuit units.

Also, the control unit 500 may electrically connect the plurality of sensing circuit units for touch sensing to the third pattern 103 of the sensor unit 100. The control unit 500 may control the plurality of switches sw to electrically connect the conductive traces connected to the plurality of third patterns 103 to the plurality of sensing circuit units.

In the touch sensing mode, the control unit 500 simultaneously or sequentially applies a driving signal (or touch driving signal) for touch sensing to the plurality of first patterns 101 and receives a sensing signal (or touch sensing signal) received from the plurality of third patterns 103. The plurality of sensing circuit units of the control unit 500 electrically connected to the plurality of third patterns 103 may output information on capacitance variation contained in an inputted sensing signal as a predetermined voltage value. The control unit 500 may process the outputted voltage value to detect a touch position.

Although the control unit 500 is not electrically connected to the plurality of second patterns 102 in FIG. 5, the plurality of driving circuit units may be electrically connected to the plurality of second patterns 102 so that capacitive coupling is not generated between the first pattern 101 and the second pattern 102. Here, the control unit 500 may control the same driving signal as the driving signal applied to the plurality of first patterns 101 to be applied to the plurality of second patterns 102. Also, the control unit 500 may control a predetermined reference potential to be applied to the plurality of second patterns 102 when the driving signal is applied to the plurality of first patterns 101.

FIG. 6 is a view illustrating a case in which the touch input device in FIG. 4 operates in the antenna driving mode (or stylus driving mode, or stylus uplink mode).

Referring to FIGS. 4 and 6, in case of the antenna driving mode, the control unit 500 may electrically connect the plurality of driving circuit units for antenna driving to the plurality of second patterns 102 of the sensor unit 100. The control unit 500 may control the plurality of switches sw to electrically connect conductive traces connected to the plurality of second patterns 102 to the plurality of driving circuit units.

The control unit 500 may control a driving signal (or pen driving signal) outputted from each driving circuit unit connected to the plurality of second patterns 102.

For example, the control unit 500 may control: a pulse signal having a predetermined frequency to be outputted from a first driving circuit unit: any pulse signal not to be outputted from a second driving circuit unit: and a reverse pulse signal having a phase opposite to that of the pulse signal outputted from the first driving circuit unit to be outputted from a third driving circuit unit, among the plurality of driving circuit units connected to the plurality of second patterns 102. In this case, a current loop is formed by the second pattern 102 electrically connected to the first driving circuit unit and the second pattern 102 electrically connected to the third driving circuit unit. A magnetic field is generated by the formed current loop, and a stylus pen adjacent to the sensor unit 100 may be resonated and driven by the magnetic field.

The control unit 500 may control opposite pulse signals to be outputted from two random driving circuit units among the plurality of driving circuit units electrically connected to the plurality of second patterns 102. Thus, the control unit 500 may variously change and set a size and a position of the current loop. For example, when the control unit 500 detects a position of the stylus pen adjacent to the sensor unit 100, the control unit 500 may control opposite signals to be outputted from the driving circuit unit electrically connected to two second patterns disposed around the position of the stylus pen, and when the control unit 500 does not detect the position of the stylus pen, the control unit 500 may control opposite signals to be outputted from the driving circuit unit electrically connected to two second patterns disposed both outermost portions among the plurality of second patterns 102.

The control unit 500 may simultaneously form two or more current loops. This will be described with reference to FIG. 7.

(a) to (c) of FIG. 7 are views for explaining various methods by which the control unit 500 applies a pen driving signal for driving the stylus pen to the plurality of second patterns 102 in FIG. 4. For reference, in (a) to (c) of FIG. 7, one second pattern 102 in FIG. 4 is simply illustrated as one line Ch, and each line Ch is one channel.

(a) of FIG. 7 shows a case in which a stylus pen 50 is disposed on a central portion (an area except for an edge) of the sensor unit 100 in FIG. 4, e.g., a fifth channel Ch5. In this case, the control unit 500 may control a plurality of driving circuit units so that a pulse signal and a reverse pulse signal (or ground) are applied to the same number of channels Ch2, Ch3, Ch4/Ch6, Ch7, Ch8 on left and right sides based on a position on which the stylus pen 50 is disposed. Specifically, the control unit 500 may control the pulse signal to be applied to the three second to fourth channels Ch2, Ch3, and Ch4 disposed on the left side of the stylus pen 50 and the reverse pulse signal to be applied to the three sixth to eighth channels Ch6, Ch7, and Ch8 disposed at the right side of the stylus pen 50. Here, although the pulse signal and the reverse pulse signal (or ground) are applied to the three channels on each of the left and right sides with respect to the stylus pen 50 in (a) of FIG. 7, the embodiment of the present invention is not limited thereto. For example, in (a) of FIG. 7, the pulse signal and the reverse pulse signal (or ground) may be applied to two channels or one channel on each of the left and right sides with respect to the stylus pen 50, or the pulse signal and the reverse pulse signal (or ground) may be applied to four or more channels.

(b) of FIG. 7 shows a case in which the stylus pen 50 is disposed on the edge of the sensor unit 100 in FIG. 4. For example, the stylus pen 50 is disposed between a 0-th channel Ch0 and a first channel Ch1. When compared with (a) of FIG. 7, the control unit 500 may not apply the pulse signal and the reverse pulse signal (or ground) to the same number of channel(s) on each of the left and right sides with respect to the stylus pen 50. In this case, the control unit 500 may control the pulse signal and the reverse pulse signal (or ground) to be applied to the different number of channels on the left and right sides with respect to the stylus pen 50. Specifically, the control unit 500 may control the pulse signal to be applied to the 0-th channel Ch0 and the reverse pulse signal to be applied to the first to third channels Ch1, Ch2, and Ch3. Although not shown in the drawings, when the stylus pen 50 is disposed at an outermost edge of the left side of the 0-th channel Ch0, the control unit 500 may control the reverse pulse signal to be applied to the 0-th to second channels Ch0, Ch1, and Ch2.

In (a) and (b) of FIG. 7, as the number of channels Ch0, Ch1, . . . , Ch19 increases, the number of terminals of the control unit 500 for driving each channel increases, and a configuration of the driving circuit unit becomes complicated. Thus, at least two or more channels adjacent to each other among the channels Ch0, Ch1, . . . , Ch19 may be electrically connected to be driven as one channel. Specifically, as illustrated in (c) of FIG. 7, two channels are electrically connected into one channel. In this configuration, the same signal is simultaneously applied to the two electrically connected channels. (c) of FIG. 7 shows a case in which 20 channels Ch0, Ch1, . . . , Ch19 are electrically connected for each two channels to form 10 channels. Although not shown in the drawing, seven channels may be configured such that the 20 channels are electrically connected for each three channels and the rest two channels are electrically connected, and five channels may be configured such that the 20 channels are electrically connected for each four channels.

FIG. 8 is a view illustrating a case in which the touch input device in FIG. 4 operates in the stylus sensing mode (or stylus downlink mode).

Referring to FIGS. 4 and 8, in case of the stylus sensing mode, the control unit 500 may electrically connect the plurality of sensing circuit units for stylus sensing to the first pattern 101 and the third pattern 103 of the sensor unit 100. The control unit 500 may control the plurality of switches sw to electrically connect the conductive traces connected to the plurality of first patterns 101 and the plurality of third patterns 103 to the plurality of sensing circuit units.

The touch input device according to an embodiment of the present invention has an advantage in that an output voltage value of the plurality of sensing circuit units is hardly varied according to the position of the stylus pen on the sensor unit 100 in the stylus sensing mode due to the configuration of the sensor unit 100. A specific principle for this will be described with reference to (a) to (f) of FIG. 9.

(a) to (f) of FIG. 9 are schematic views for explaining an operation principle of the stylus sensing mode of FIG. 8.

(a) of FIG. 9 is a schematic circuit diagram of modeling one first pattern 101 in FIG. 8 and the sensing circuit unit of the control unit 500 electrically connected thereto, and (b) of FIG. 9 is a schematic circuit diagram of modeling the second pattern 102 disposed in one first pattern 101

(c) of FIG. 9 is a voltage distribution graph in the circuit diagram of (a) of FIG. 9, and (d) of FIG. 9 is a voltage distribution graph in the circuit diagram of (b) of FIG. 9.

Referring to (a) and (c) of FIG. 9, when the stylus pen approaches an arbitrary point A spaced away from the sensing circuit unit on the first pattern 101, a voltage Vemf (hereinafter, referred to as an 'induced voltage') induced by a signal emitted from the stylus pen is generated at the corresponding point A.

When the induced voltage Vemf is generated at the point A, since an equivalent capacitance of the first pattern 101 viewed from the point A to the left side decreases, equivalent impedance increases. Thus, as most of the induced voltage Vemf is applied to the left side of the point A, and a voltage of about 0 V is applied to the right side of the point A, almost no current flows. Furthermore, as the voltage of about 0 V applied to the right side of the point A gradually decreases by equivalent resistances of the first pattern 101, almost no voltage is applied to an input terminal of the sensing circuit unit.

Referring to (b) and (d) of FIG. 9, when the induced voltage Vemf is generated at the point A, since the other ends of each second pattern 102 are electrically connected to each other on the left side of the point A, the equivalent capacitance viewed from the point A to the left side increases, and the equivalent impedance approaches almost 0. Thus, a voltage of 0 V is applied to the left side of the point A, and the voltage Vemf is applied to the right side of the point A without causing a voltage drop at equivalent resistors because one end of the second pattern 102 is opened.

When (c) and (d) of FIG. 9 are compared, it may be known that a potential difference as much as the voltage Vemf exists at any position between the first pattern 101 and the second pattern 102. The potential difference as much as the voltage Vemf between the first pattern 101 and the second pattern 102 causes capacitive coupling between the first pattern 101 and the second pattern 102. As illustrated in (e) of FIG. 9, current flows from the second pattern 102 to the first pattern 101 by the capacitive coupling. As illustrated in (a) of FIG. 9, although current generated from the first pattern 101 itself gradually decreases as a distance from the position of the stylus pen to the sensing circuit unit of the control unit 500 increases, since current is introduced to the first pattern 101 from the second pattern 102, current outputted from the first pattern 101 to the sensing circuit unit of the control unit 500 has almost no difference from the position of the pen. Thus, the control unit 500 may sense the position of the stylus pen through the sensing circuit unit electrically connected to the first pattern 101.

As illustrated in (a) to (e) of FIG. 9, it may be known that a potential difference between the first pattern 101 and the second pattern 102 is constant as the voltage Vemf although the point A moves to the left or right side. Thus, the control unit 500 may sense the stylus pen from a constant signal outputted from the sensing circuit unit regardless of whether the position of the stylus pen on the sensor unit 100 is close to or far from the sensing circuit unit.

Although the current is introduced to the first pattern 101 from the second pattern 102 by the capacitive coupling in a description of (e) of FIG. 9, the embodiment of the present invention is not limited thereto. For example, current may be also introduced to the first pattern 101 from the second pattern 102 by magnetic coupling (magnetic field coupling).

FIG. 10 is a schematic view illustrating a touch input device according to another embodiment of the present invention.

Referring to FIG. 10, the touch input device according to another embodiment of the present invention includes a sensor unit 100' and a control unit 500'.

The sensor unit 100' includes a plurality of patterns. The plurality of patterns may include a first-a pattern 101*a*, a first-b pattern 101*b*, a second-a pattern 102*a*, a second-b pattern 102*b*, a third pattern 103, and a fourth pattern 104. Here, since the third pattern 103 and the fourth pattern 104 have the same configuration as the third pattern part 103 and the fourth pattern part 104 of the sensor unit 100 in FIG. 4, a description thereof will be omitted.

The first-a pattern 101*a* has a shape extending along the first direction (or major axis).

The first-a pattern 101*a* may include an inverted triangle pattern part, a triangle pattern part, and a connection pattern part connecting the inverted triangle pattern part and the triangular pattern part.

The first-a pattern 101a may have an opening in which the second-a pattern 102a is disposed.

The first-a pattern 101a may have a structure surrounding the second-a pattern 102a. The first-a pattern 101a is spaced a predetermined distance from the second-a pattern 102a. Through this, the first-a pattern 101a and the second-a pattern 102a are electrically insulated from each other.

The second-a pattern 102a is disposed in the first-a pattern 101a.

The second-a pattern 102a may include an inverted triangle pattern part, a triangle pattern part, and a connection pattern part connecting the inverted triangle pattern part and the triangular pattern part.

The first-b pattern 101b has a shape extending along the first direction (or major axis).

The first-b pattern 101b may include an inverted triangle pattern part, a triangle pattern part, and a connection pattern part connecting the inverted triangle pattern part and the triangular pattern part.

The first-b pattern 101b may have an opening in which the second-b pattern 102b is disposed.

The first-b pattern 101b may have a structure surrounding the second-b pattern 102b. The first-b pattern 101b is spaced a predetermined distance from the second-b pattern 102b. Through this, the first-b pattern 101b and the second-b pattern 102b are electrically insulated from each other.

The second-b pattern 102b is disposed in the first-b pattern 101b.

The second-b pattern 102b may include an inverted triangle pattern part, a triangle pattern part, and a connection pattern part connecting the inverted triangle pattern part and the triangular pattern part.

A plurality of the first-a patterns 101a and a plurality of the first-b patterns 101b are alternately arranged along the first direction, the plurality of the first-a patterns 101a are electrically connected to each other, and the plurality of the first-b patterns 101b are also electrically connected to each other.

The first-a pattern 101a disposed at one end of the plurality of the first-a patterns 101a is electrically connected to the control unit 500'.

The first-b pattern 101b disposed at one end of the plurality of the first-b patterns 101b is electrically connected to the control unit 500'.

A plurality of the second-a patterns 102a and a plurality of the second-b patterns 102b are alternately arranged along the first direction and electrically connected to each other. The second-b pattern 102b disposed at one end of the plurality of second-b patterns 102b may be electrically connected to the control unit 500', and the second-a pattern 102a disposed at the other end of the plurality of the second-a patterns 102a may be electrically connected to other adjacent second-a patterns. Here, other second-a patterns adjacent to the second-a pattern 102a disposed at the other end may be grounded.

The first-a pattern 101a, the first-b pattern 101b, the second-a pattern 102a, and the second-b pattern 102b may be disposed on the same layer. The first-a pattern 101a, the first-b pattern 101b, the second-a pattern 102a, and the second-b pattern 102b may be formed on the same layer by using a metal mesh.

The control unit 500' has the same function as the controller unit 500 in FIG. 4.

FIG. 11 is a view illustrating a case in which the touch input device in FIG. 10 operates in the touch sensing mode (or 2D sensing mode).

Referring to FIGS. 10 and 11, in case of the touch sensing mode, the control unit 500' may electrically connect the plurality of driving circuit units for touch sensing to the third pattern 103 of the sensor unit 100'. One driving circuit unit may be electrically connected to each of the plurality of the third patterns 103.

Also, the control unit 500' may electrically connect the sensing circuit unit for touch sensing to the first-a and first-b patterns 101a and 101b of the sensor unit 100'.

In the touch sensing mode, the control unit 500' applies a driving signal for touch sensing to the plurality of the third pattern 103 and receives a sensing signal received from the plurality of the first-a and the first-b patterns 101a and 101b. The sensing circuit unit of the control unit 500' electrically connected to the plurality of first-a and first-b patterns 101a and 101b may output information on capacitance variation contained in the input sensing signal as a predetermined voltage value. The control unit 500 may process the outputted voltage value to detect a touch position. Here, the control unit 500' may cancel a display noise and a LGM noise by subtracting the sensing signal received from the first-b pattern 101b from a sensing signal received from the first-a pattern 101a.

Here, the control unit 500' controls the same driving signal to be applied to the plurality of third patterns 103 and the plurality of fourth patterns 104, so that capacitive coupling is not generated between the third pattern 103 and the fourth pattern 104. Alternatively, the control unit 500' may control a reference potential to be applied to the plurality of fourth patterns 104.

FIG. 12 is a view illustrating a case in which the touch input device illustrated in FIG. 10 operates in the antenna driving mode (or stylus driving mode, or stylus uplink mode).

Referring to FIGS. 10 and 12, in case of the antenna driving mode, the control unit 500' may electrically connect the driving circuit unit for antenna driving to the plurality of second-a and second-b patterns 102a and 102b of the sensor unit 100'.

The control unit 500' may control a driving signal outputted from each driving circuit unit connected to the plurality of second-a and second-b patterns 102a and 102b. For example, the control unit 500' may control a first driving circuit unit to output a pulse signal having a predetermined frequency, a second driving circuit unit not to output a pulse signal, and a third driving circuit unit to output a pulse signal that is opposite to the pulse signal outputted from the first driving circuit unit. In this case, a current loop is formed by the second-a and second-b patterns 102a and 102b electrically connected to the first driving circuit unit and the second-a and second-b patterns electrically connected to the third driving circuit unit. A magnetic field is generated by the formed current loop, and the stylus pen adjacent to the magnetic field may be resonated and driven by the magnetic field.

The control unit 500' may control two arbitrary driving circuit units among the plurality of driving circuit units electrically connected to the plurality of second-a and second-b patterns 102a and 102b to output pulse signals opposite to each other. Thus, the control unit 500' may variously change and set a size and a position of the current loop. For example, when the control unit 500' detects a position of the stylus pen adjacent to the sensor unit 100', the control unit 500' may control opposite driving signals to be outputted from the driving circuit unit electrically connected to two second patterns disposed around the position of the stylus pen, and when the control unit 500' does not detect the position of the stylus pen, the control unit 500' may control opposite driving signals to be outputted from the driving circuit unit electrically connected to two second-a and second-b patterns 102*a* and 102*b* disposed both outermost portions among the plurality of second-a and second-b patterns 102*a* and 102*b*.

Although not shown in the drawing, the control unit 500' may control the driving signal to be applied to the plurality of first-a patterns 101*a*, the plurality of first-b patterns 101*b*, or the plurality of third patterns 103. In this case, the total number of channels may be reduced.

FIG. 13 is a view illustrating a case in which the touch input device in FIG. 10 operates in the stylus sensing mode (or stylus downlink mode).

Referring to FIGS. 10 and 13, in case of the stylus sensing mode, the control unit 500' may electrically connect the sensing circuit unit for stylus sensing to the first-a and first-b patterns 101*a* and 101*b* and the third pattern 103 of the sensor unit 100'.

In the stylus sensing mode, similar to the principle described with reference to FIG. 8, when the stylus pen approaches an arbitrary position of the sensor unit 100', a predetermined signal is outputted from the stylus pen, and an induced voltage is generated in the first-a, first-b, second-a, second-b, third, and fourth patterns 101*a*, 101*b*, 102*a*, 102*b*, 103, and 104 by the outputted signal.

Here, when the stylus pen is spaced apart from the control unit 500', since current is introduced from the plurality of second-a patterns 102*a* although current does not flow through the plurality of first-a patterns 101*a* themselves by the generated induced voltage, the control unit 500' may detect the position of the stylus pen through the sensing circuit unit electrically connected to the plurality of first-a patterns 101*a*. Here, the feature in which the current is introduced from the second-a pattern 102*a* to the first-a pattern 101*a* is caused by capacitive coupling between the first-a pattern 101*a* and the second-a pattern 102*a*, which occurs by a potential difference generated as much as the induced voltage between the first-a pattern 101*a* and the second-a pattern 102*a*.

Likewise, although almost no current flows through the plurality of first-b patterns 101*b* themselves, since current is introduced from the plurality of second-b patterns 102*b*, the control unit 500' may detect the position of the stylus pen through the sensing circuit unit electrically connected to the plurality of first-b patterns 101*b*.

Likewise, although almost no current flows through the plurality of third patterns 103 themselves, since current is introduced from the plurality of fourth patterns 104, the control unit 500' may detect the position of the stylus pen through the sensing circuit unit electrically connected to the third pattern 103.

Although not shown in the drawing, unlike FIG. 13, the control unit 500' may electrically connect the sensing circuit units to the plurality of second-a patterns 102*a*, the plurality of second-b patterns 102*b*, or the fourth pattern 104 to detect the position of the stylus pen.

FIG. 14 is a schematic view illustrating a touch input device according to another embodiment of the present invention.

A sensor unit 100" of the touch input device in FIG. 14 has the same structure of the first-a, first-b, second-a, second-b, third, and fourth patterns as the sensor unit 100' in FIG. 10. The sensor unit 100" is different from the sensor unit 100' in that the first-b pattern disposed at one side (lower side) among the plurality of first-b patterns 101*b* electrically connected to each other in the first direction is electrically connected to a control unit 500" through the conductive trace, and the first-a pattern disposed at the other side (upper side) among the plurality of first-a patterns 101*a* electrically connected to each other in the first direction is electrically connected to the control unit 500" through the conductive trace.

FIG. 15 is a view illustrating a case in which the touch input device in FIG. 14 operates in the touch sensing mode (or 2D sensing mode).

Since the touch sensing mode is the same as that described in FIG. 11, a description thereof will be omitted.

FIG. 16 is a view illustrating a case in which the touch input device in FIG. 14 operates in the antenna driving mode (or stylus driving mode, or stylus uplink mode).

Since the antenna driving mode is the same as that described in FIG. 12, a description thereof will be omitted.

FIG. 17 is a view illustrating a case in which the touch input device in FIG. 14 operates in the stylus sensing mode (or stylus downlink mode).

The stylus sensing mode of FIG. 17 is different from that of FIG. 15.

When the stylus pen approaches an arbitrary position on the sensor unit 100" and then is driven to emit a signal from the stylus pen, a predetermined signal is outputted from the stylus pen, and an induced voltage is generated in the first-a, first-b, second-a, second-b, third, and fourth patterns 101*a*, 101*b*, 102*a*, 102*b*, 103, and 104 by the outputted signal.

Here, when the stylus pen is spaced apart from the control unit 500", although almost no current flows through the plurality of first-b patterns 101*b* by the generated induced voltage, since current is introduced from the plurality of first-a patterns 101*a* as well as the plurality of second-b patterns 102*b*, the control unit 500" may detect the position of the stylus pen through the sensing circuit unit electrically connected to the plurality of first-b patterns 101*b*. Here, the feature in which current is introduced from the second-b patterns 102*b* and the first-a patterns 101*a* to the first-b patterns 101*b* is caused by capacitive coupling between the first-b patterns 101*b* and the second-b pattern 102*b* and capacitive coupling between the first-b patterns 101*b* and the first-a pattern 101*a*, which occur by potential differences generated as much as the induced voltage between the first-b patterns 101*b* and the second-b patterns 102*b* and between the first-b patterns 101*b* and the first-a patterns 101*a*.

Here, unlike FIG. 13, a reason why current is introduced from the first-a pattern 101*a* to the first-b pattern 101*b* is that a relatively large amount of current flows through the plurality of first-a patterns 101*a* themselves. This is because a direction of conductive traces connected to the plurality of first-a patterns 101*a* is opposite to that of conductive traces connected to the plurality of first-b patterns 101*b*. In other words, when the stylus pen is spaced apart from the sensing circuit unit connected to the plurality of first-b patterns 101*b*, the stylus pen is disposed closer to the sensing circuit unit connected to the plurality of first-a patterns 101*a*.

Likewise, although almost no current flows through the plurality of third patterns 103 themselves, since current is introduced from the plurality of fourth patterns 104, the control unit 500" may detect the position of the stylus pen through the sensing circuit unit electrically connected to the third pattern 103.

Although not shown in the drawing, unlike FIG. 17, the control unit 500" may electrically connect the sensing circuit units to the plurality of second-a patterns 102*a*, the plurality of second-b patterns 102*b*, or the fourth pattern 104 to detect the position of the stylus pen.

FIG. 18 is a table showing characteristics of various embodiments illustrated in FIGS. 4, 10, and 14.

Referring to FIG. 18, the embodiment of FIG. 4 may include total 70 to 80 channels. Specifically, a driving electrode TX used in the touch sensing mode may include 20 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 4 may include 20 left conductive traces and 20 right conductive traces in the second direction (minor axis). Thus, a width of a bezel of the touch input device may be maintained as same as an original width thereof.

The embodiment of FIG. 10 may include total 90 to 100 channels. Specifically, a driving electrode TX used in the touch sensing mode may include 40 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 10 may include 20 left conductive traces and 20 right conductive traces in the second direction (minor axis). Thus, a width of a bezel of the touch input device may be maintained as same as an original width thereof.

The embodiment of FIG. 14 may include total 90 to 100 channels. Specifically, a driving electrode TX used in the touch sensing mode may include 40 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 14 may include 30 left conductive traces and 30 right conductive traces in the second direction (minor axis).

FIG. 19 is a partial plan view illustrating a sensor unit 200 according to another embodiment, which may replace the sensor unit 100 of FIG. 4

Referring to FIG. 19, the sensor unit 200 according to another embodiment of the present invention includes a plurality of first patterns and a plurality of second patterns. Hereinafter, the plurality of first patterns will be described as a plurality of driving electrodes TX0, TX1, TX2, . . . , and the plurality of second patterns will be described as a plurality of receiving electrodes RX0, RX1, RX2 . . . . Alternatively, although not shown in the drawing, the plurality of first electrodes may be a plurality of receiving electrodes RX0, RX1, RX2, . . . , and the plurality of second electrodes may be a plurality of driving electrodes TX0, TX1, TX2, . . . .

The plurality of driving electrodes TX0, TX1, TX2, . . . may have a shape extending in a first direction (or horizontal direction), and the plurality of receiving electrodes RX0, RX1, RX2, . . . may have a shape extending in a second direction (or vertical direction) perpendicular to the first direction.

A predetermined capacitance is formed between the plurality of driving electrodes TX0, TX1, TX2, . . . and the plurality of receiving electrodes RX0, RX1, RX2, . . . , particularly at a crossing portion therebetween. The capacitance is varied when a touch input is generated at a corresponding point or a surrounding thereof. Thus, whether a touch is generated or a touch input may be detected by detecting an amount of a capacitance variation from a signal outputted from the plurality of receiving electrodes RX0, RX1, RX2, . . . .

Each of the plurality of driving electrodes TX0, TX1, TX2, . . . in FIG. 19 includes a first driving pattern part 211, a second driving pattern part 213, and a connection pattern 215.

The first driving pattern part 211 has a diamond shape or a rhombus shape and includes an opening O. The opening O has a diamond shape or a rhombus shape corresponding to an outer shape of the first driving pattern part 211. The first driving pattern part 211 may have a diamond or rhombus band shape by the opening O. Although the first driving pattern part 211 has a diamond or rhombus shape in the drawings, this is merely an example. For example, the first driving pattern part 211 may have a polygonal or rectangular shape.

The second driving pattern part 213 is disposed in the opening O of the first driving pattern part 211.

The second driving pattern part 213 may have a diamond shape or a rhombus shape. The second driving pattern part 213 may have an outer shape corresponding to that of the first driving pattern part 211. The second driving pattern part 213 may not have an opening therein unlike the first driving pattern part 211.

The first driving pattern part 211 and the second driving pattern part 213 are spaced a predetermined distance from each other.

The first driving pattern part 211 in which the second driving pattern part 213 is disposed is provided in plurality and arranged in the first direction (or horizontal direction). The connection patterns 215 disposed between the plurality of first driving pattern parts 211 electrically connect the plurality of first driving pattern parts 211 to each other.

The connection pattern 215 connects two adjacent first driving pattern parts 211. The connection pattern 215 has one end connected to the first driving pattern part 211 disposed at one side and the other end connected to the first driving pattern part 211 disposed at the other side. Although the connection pattern 215 may have a bar shape, the embodiment of the present invention is not limited thereto. For example, the connection pattern 215 may have various shapes connecting two adjacent first driving pattern parts 211.

The plurality of first driving pattern parts 211, the plurality of second driving pattern parts 213, and the plurality of connection patterns 215 are disposed on the same layer. The plurality of first driving pattern parts 211, the plurality of second driving pattern parts 213, and the plurality of connection patterns 215 may be made of the same material. For example, the plurality of first driving pattern parts 211, the plurality of second driving pattern parts 213, and the plurality of connection patterns 215 may be made of a metal mesh. As the metal mesh is patterned according to shapes of the plurality of first driving pattern parts 211, the plurality of second driving pattern parts 213, and the plurality of connection patterns 215, the plurality of driving electrodes TX0, TX1, TX2, . . . may be formed.

Although the second driving pattern part 213 is disposed in the opening of the first driving pattern part 211 in FIG. 19, the embodiment of the present invention is not limited thereto. For example, each of the first driving pattern part 211 and the second driving pattern part 213 may have a shape different from the diamond or rhombus shape. The first driving pattern part 211 and the second driving pattern part 213 may be combined with various shapes to form one driving electrode.

The second driving pattern parts 213 of respective drive electrodes TX0, TX1, and TX2 are electrically connected. For example, the second driving pattern parts 213 of the driving electrodes TX0, TX1, and TX2 may be electrically connected through a bridge and a via.

The first driving pattern parts 211 disposed at the other edge among the first driving pattern parts 211 of each of the driving electrodes TX0, TX1, and TX2 are electrically opened, and the second driving pattern parts 213 disposed at the other edge among the second driving pattern parts 213 of each of the driving electrodes TX0, TX1, and TX2 may be electrically connected. For example, the second driving pattern parts 213 of the driving electrodes TX0, TX1, and TX2 may be electrically connected through a bridge and a via. Here, the other side represents a farthest side from the control unit 500 of FIG. 4 among the first and second driving pattern parts 211 and 213 of each of the driving electrodes TX0, TX1, and TX2.

Each of the plurality of receiving electrodes RX0, RX1, and RX2 includes a first receiving pattern part 231 and a second pattern part 233. Since the first driving pattern part 231 and the second driving pattern part 233 have the same shape as the first driving pattern part 211 and the second driving pattern part 213, a detailed description thereof will be omitted.

A plurality of first receiving pattern parts 231 are arranged in the second direction (or vertical direction). The plurality of first receiving pattern parts 231 are electrically connected to each other. For example, the plurality of first receiving pattern parts 231 are electrically connected through a bridge or a via.

A plurality of second receiving pattern parts 233 are arranged in the first receiving pattern parts 231, respectively, in the second direction (or vertical direction). The plurality of first receiving pattern parts 233 are electrically connected to each other. For example, the plurality of first receiving pattern parts 233 are electrically connected through a bridge or a via.

The first driving pattern parts 231 disposed at the other edge among the first driving pattern parts 231 of each of the driving electrodes RX0, RX1, and RX2 are electrically opened, and the second driving pattern parts 233 disposed at the other edge among the second driving pattern parts 233 of each of the driving electrodes RX0, RX1, and RX2 may be electrically connected. For example, the plurality of second receiving pattern parts 233 are electrically connected through a bridge or a via. Here, the other side represents a farthest side from the control unit 500 of FIG. 4 among the first and second driving pattern parts 231 and 233 of each of the driving electrodes RX0, RX1, and RX2.

For example, the plurality of first receiving pattern parts 231, the plurality of second receiving pattern parts 233 may be disposed on the same layer. Here, the plurality of first receiving pattern parts 231 and the plurality of second receiving pattern parts 233 may be disposed on the same layer with the plurality of first driving pattern parts 211, the plurality of second driving pattern parts 213, and the plurality of connection patterns 215.

The plurality of first receiving pattern parts 231 and the plurality of second receiving pattern parts 233 may be made of the same material. For example, the plurality of first receiving pattern parts 231 and the plurality of second receiving pattern parts 233 may be made of a metal mesh. As the metal mesh is patterned according to shapes of the plurality of first receiving pattern parts 231 and the plurality of second receiving pattern parts 233, the plurality of receiving electrodes RX0, RX1, and RX2 may be formed.

Bridges for electrically connecting the second driving pattern parts 213 of each of the driving electrodes TX0, TX1, and TX2 and bridges for electrically connecting the first and second receiving pattern parts 231 and 233 of each of the receiving electrodes RX0, RX1, and RX2 may be formed on a layer different from that on which the first and second driving pattern parts 211 and 213, the connection pattern 215, and the first and second receiving pattern parts 231 and 233 are formed.

As illustrated in FIGS. 5 to 9, the sensor unit 200 in FIG. 19 may be driven in one of the touch sensing mode, the antenna driving mode, and the stylus sensing mode by the control unit 500. Specifically, in case of the touch sensing mode, the control unit 500 may control the touch driving signal to be applied to ATX1, ATX2, and ATX3 and sense a touch position by receiving a touch receiving signal from ARX1, ARX2, and ARX3. In case of the antenna driving mode, the control unit 300 may apply the pen driving signal to DTX1, DTX2, and DTX3 or DRX1, DRX2, and DRX3. In case of the stylus sensing mode, the control unit 500 may sense the position of the stylus pen by receiving the pen receiving signal from ATX1, ATX2, and ATX3 and ARX1, ARX2, and ARX3.

FIG. 20 is a partial plan view illustrating a sensor unit 200' according to another embodiment, which may replace the sensor unit 100 of FIG. 4.

The sensor unit 200' of FIG. 20 includes a plurality of driving electrodes TX0', TX1', TX2', . . . and a plurality of receiving electrodes RX0, RX1, RX2, . . . . Here, the plurality of receiving electrodes RX0, RX1, RX2, . . . are the same as the plurality of receiving electrodes RX0, RX1, RX2, . . . in FIG. 10, and the plurality of driving electrodes TX0', TX1', TX2', . . . are the same as the third and fourth pattern 103 and 104 in FIG. 4. Although not shown in the drawings, the opposite case may be true.

The sensor unit 200' of FIG. 20 may further reduce the number of bridges in comparison with the sensor unit 200 of FIG. 19. This is due to shapes of the plurality of driving electrodes TX0', TX1', TX2', . . . .

As illustrated in FIGS. 5 to 9, the sensor unit 200' in FIG. 20 may be driven in one of the touch sensing mode, the antenna driving mode, and the stylus sensing mode by the control unit 500. Specifically, in case of the touch sensing mode, the control unit 500 may control the touch driving signal to be applied to ATX1, ATX2, and ATX3 and sense a touch position by receiving a touch receiving signal from ARX1, ARX2, and ARX3. In case of the antenna driving mode, the control unit 500 may apply the pen driving signal to DTX1, DTX2, and DTX3 or DRX1, DRX2, and DRX3. In case of the stylus sensing mode, the control unit 500 may sense the position of the stylus pen by receiving the pen receiving signal from ATX1, ATX2, and ATX3 and ARX1, ARX2, and ARX3.

FIG. 21 is a view illustrating another modified example of the sensor unit 100 in FIG. 4.

Referring to FIG. 21, a structure of a main pattern part of each of first to fourth pattern parts 101', 102', 103', and 104' is different from that of FIG. 4.

In FIG. 21, the second pattern part 102' or the fourth pattern part 104' has an outer shape of an uneven structure, and an opening of the first pattern part 101' or the fourth pattern part 104' has a shape corresponding to an outer structure of the second pattern part 102' or the fourth pattern part 104'.

This structure may improve a mutual capacitance value Cm between the first pattern part 101' and the second pattern part 102' at the same layer and a mutual capacitance value Cm between the third pattern part 103' and the fourth pattern part 104' at another same layer. As the mutual capacitance Cm is improved, a voltage value outputted from the sensing circuit unit of the control unit 500 in the stylus sensing mode may increase. Thus, stylus sensing sensitivity may be improved.

Here, the modified example in FIG. 21 may be directly applied to FIGS. 19 and 20.

FIG. 22 is a view illustrating another modified example of the sensor unit 100 in FIG. 4.

When compared with the sensor unit 100 in FIG. 4, a sensor unit 100" in FIG. 22 further includes a plurality of fifth patterns 105 and a plurality of sixth patterns 106.

The plurality of fifth patterns 105 are disposed on the same layer ($2^{nd}$ layer) as the plurality of first patterns 101 and arranged in the first direction and the second direction.

Each of the fifth patterns 105 has a shape corresponding and overlapping a portion of a main pattern part of the third pattern 103 disposed on another layer ($1^{st}$ layer). Also, the fifth pattern 105 is electrically connected to the fourth pattern 104 disposed on another layer ($1^{st}$ layer) through a via.

The plurality of fifth patterns 105 and the plurality of third patterns 103 may form the mutual capacitance Cm in the vertical direction. Also, since the fifth pattern 105 is electrically connected to the fourth pattern 104 in the third pattern 103, the third pattern 103 may form the mutual capacitance Cm with the fifth pattern 105 in addition to the fourth pattern 104.

The plurality of fifth patterns 106 are disposed on the same layer ($2^{nd}$ layer) as the plurality of first patterns 103 and arranged in the first direction and the second direction.

Each of the sixth patterns 106 has a shape corresponding and overlapping a portion of the main pattern part of the first pattern 101 disposed on another layer ($2^{nd}$ layer). Also, the sixth pattern 106 is electrically connected to the second pattern 102 disposed on another layer ($1^{st}$ layer) through a via.

The plurality of sixth patterns 106 and the plurality of first patterns 101 may form the mutual capacitance Cm in the vertical direction. Also, since the sixth pattern 106 is electrically connected to the second pattern 102 in the first pattern 101, the first pattern 101 may form the mutual capacitance Cm with the sixth pattern 106 in addition to the second pattern 102.

As described above, the sensor unit 100" in FIG. 22 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 500 may increase to improve the stylus sensing sensitivity.

FIG. 23 is a view illustrating another modified example of the sensor unit 100 in FIG. 4.

When compared with the sensor unit 100 in FIG. 4, in a sensor unit 100''' in FIG. 23, a portion of a second pattern 102' is disposed on a different layer from the rest portion. Specifically, the second pattern 102' includes a plurality of main pattern parts and a connection pattern part connecting two adjacent main pattern parts of the plurality of main pattern parts, and the plurality of main pattern parts of the second pattern 102' are disposed on a different layer from the plurality of connection pattern parts of the second pattern 102'. The plurality of main pattern parts of the second pattern 102' are disposed on the same layer as the third pattern 103 and the fourth pattern 104, and the plurality of connection pattern parts of the second pattern 102' are disposed on the same layer as the first pattern 100 as with FIG. 4.

The sensor unit 100''' in FIG. 23 may be controlled by the control unit 500 and driven in the touch sensing mode, the antenna driving mode, and the stylus sensing mode as with the sensor unit 100 in FIG. 4.

FIG. 24 is a view illustrating another modified example of the sensor unit 100 in FIG. 4.

When compared with the sensor unit 100''' in FIG. 23, in a sensor unit 100'''' in FIG. 24, a portion of a second pattern 104' is disposed on a different layer from the rest portion. Specifically, the fourth pattern 104' includes a plurality of main pattern parts and a connection pattern part connecting two adjacent main pattern parts of the plurality of main pattern parts, and the plurality of main pattern parts of the fourth pattern 104' are disposed on a different layer from the plurality of connection pattern parts of the fourth pattern 104'. The plurality of main pattern parts of the fourth pattern 104' are disposed on the same layer as the first pattern 101, and the plurality of connection pattern parts of the fourth pattern 104' are disposed on the same layer as the plurality of main pattern parts of the second pattern 102' and the third pattern 103.

In summary, in the sensor unit 100'''' in FIG. 24, the first pattern 101, the plurality of connection pattern part of the second pattern 102', and the plurality of main pattern parts of the fourth pattern 104' are disposed on the first layer, and the third pattern 103, the plurality of connection pattern part of the fourth pattern 104', and the plurality of main pattern part of the second pattern 102' are disposed on the second layer. Here, the first layer and the second layer are different from each other, and a position relationship is that one is disposed on the other.

The sensor unit 100'''' in FIG. 24 may be driven in the touch sensing mode, the antenna driving mode, and the stylus sensing mode by the control unit 500 as with the sensor unit 100 in FIG. 4.

FIG. 25 is a view illustrating another modified example of the sensor unit 100 in FIG. 4.

A sensor unit 100''''' in FIG. 25 is a modified from the sensor unit 100'''' in FIG. 24. When compared with the sensor unit 100'''' in FIG. 24, the sensor unit 100''''' in FIG. 25 is different in a second pattern 102" and a fourth pattern 104".

Specifically, the second pattern 102" includes a plurality of main pattern parts 102a" and a plurality of connection pattern parts 102b''', and the main pattern part 102a" has a size greater than that of the main pattern part of the second pattern 102' of the sensor unit 100'''' in FIG. 24. The main pattern part 102a" may have a size and a shape corresponding to those of the main pattern part of the first pattern 101.

Also, the fourth pattern 104" includes a plurality of main pattern parts 104a" and a plurality of connection pattern parts 104b', and the main pattern part 104a" has a size greater than that of the main pattern part of the fourth pattern 104' of the sensor unit 100'' in FIG. 24. The main pattern part 104a" may have a size and a shape corresponding to those of the main pattern part of the third pattern 103.

Since the main pattern part 102a" of the second pattern 102" has a size greater than that of the main pattern part of the second pattern 102' in FIG. 24, an area corresponding to the first pattern 101 may increase to further improve the mutual capacitance Cm between the second pattern 102" and the first pattern 101. Thus, the stylus sensing sensitivity may be further improved in the stylus sensing mode.

Since the main pattern part 104a" of the fourth pattern 104" has a size greater than that of the main pattern part of the fourth pattern 104' in FIG. 24, an area corresponding to the third pattern 103 may increase to further improve the mutual capacitance Cm between the fourth pattern 104" and the third pattern 103. Thus, the stylus sensing sensitivity may be further improved in the stylus sensing mode.

FIG. 26 is a view illustrating another modified example of the sensor unit 100 in FIG. 4.

When compared with the sensor unit 100 in FIG. 4, a sensor unit 100"''' in FIG. 26 is different in that the other ends of the plurality of second patterns 102 are electrically connected to the other ends of the plurality of fourth patterns 104.

This configuration has an advantage of reducing an impedance because the plurality of second patterns 102 as well as other fourth patterns are electrically connected to one fourth pattern 104 when the sensor unit 100"''' is driven in the stylus sensing mode.

The sensor unit 100 in FIG. 4 may implement the antenna driving mode and the stylus sensing mode in various methods. Specifically, this will be described with reference to FIG. 27.

(a) to (c) of FIG. 27 are views for explaining various methods for operating the sensor unit 100 in FIG. 4 in the antenna driving mode (driving) and the stylus sensing mode (receiving).

(a) of FIG. 27 is a view illustrating a state in which the conductive traces are connected to the first to fourth patterns 101, 102, 103, and 104 of the sensor unit 100 of FIG. 4, and (b) of FIG. 27 is a table for explaining a method for operating the sensor unit in (a) of FIG. 27 in the antenna driving mode (driving) and the stylus sensing mode (receiving).

In (a) of FIG. 27, the first pattern 101 corresponds to ATX, the second pattern 102 to DTX, the third pattern 103 to ARX, and the fourth pattern 104 to DRX.

Referring to (b) of FIG. 27, embodiment 1 uses DTX or/and DRX in the antenna driving mode, and uses ATX and ARX in the stylus sensing mode. Embodiment 2 uses DTX or/and DRX in the antenna driving mode, and uses DTX and DRX in the stylus sensing mode. Embodiment 3 uses ATX or/and ARX in the antenna driving mode, and uses ATX and ARX in the stylus sensing mode. Embodiment 4 uses ATX or/and ARX in the antenna driving mode, and uses DTX and DRX in the stylus sensing mode. Embodiment 5 uses ATX or/and DRX in the antenna driving mode, and uses ATX and ARX in the stylus sensing mode. Embodiment 6 uses ATX or/and DRX in the antenna driving mode, and uses DTX and DRX in the stylus sensing mode. Embodiment 7 uses DTX or/and ARX in the antenna driving mode, and uses ATX and ARX in the stylus sensing mode. Embodiment 8 uses DTX or/and ARX in the antenna driving mode, and uses DTX and DRX in the stylus sensing mode.

The embodiments 1 to 8 are illustrative, and when the sensor unit 100 of FIG. 4 is used in the antenna driving mode, only one of the first pattern 101 and the second pattern 102 may be used, only one of the third pattern 103 and the fourth pattern 104 may be used, or one of the first pattern 101 and the second pattern 102 and one of the third pattern 103 and the fourth pattern 104 may be used together. When the sensor unit 100 of FIG. 4 is used in the stylus sensing mode, one of the first pattern 101 and the second pattern 102 and one of the third pattern 103 and the fourth pattern 104 may be used together.

On the other hand, various driving methods in (b) of FIG. 27 is applicable to the sensor units in FIGS. 10, 14, 19, 20, 21, 22, 23, 24, 25, and 26.

FIG. 28 is a view for explaining another example of operating the sensor unit 100 in FIG. 4 in the antenna driving mode.

Although only the plurality of second patterns 102 are used to operate the sensor unit 100 in FIG. 4 in the antenna driving mode, the plurality of fourth patterns 104 in addition to the plurality of second patterns 102 may be used together in the antenna driving mode in FIG. 28.

The control unit 500 may control the pen driving signal to be simultaneously applied to the plurality of second patterns 102 and the plurality of fourth patterns 104 or control the pen driving signal to be applied to the plurality of second patterns 102 and then applied to the plurality of fourth patterns 104, and vice versa.

FIG. 29 is a view for explaining another example of operating the sensor unit 100 in FIG. 4 in the antenna driving mode.

Although only the plurality of second patterns 102 are used to operate the sensor unit 100 in FIG. 4 in the antenna driving mode, the plurality of first patterns 101 and the plurality of third patterns 103 may be used together in the antenna driving mode in FIG. 29.

The control unit 500 may control the pen driving signal to be simultaneously applied to the plurality of first patterns 101 and the plurality of third patterns 103 or control the pen driving signal to be applied to the plurality of first patterns 101 and then applied to the plurality of third patterns 103, and vice versa.

FIG. 30 is a view for explaining another example of operating a sensor unit 100 in FIG. 4 in the stylus sensing mode.

Although only the plurality of first patterns 101 and the plurality of third patterns 103 are used to operate the sensor unit 100 in FIG. 4 in the antenna driving mode in FIG. 8, the plurality of second patterns 102 and the plurality of fourth patterns 104 may be used together in the stylus sensing mode in FIG. 30.

In case of the stylus sensing mode, the control unit 500 may sense the pen sensing signal received from the plurality of the second patterns 102 and the plurality of the fourth patterns 104 to detect the position of the stylus pen.

FIG. 31 is a view for explaining another example of operating the sensor unit 100 in FIG. 4 in the stylus sensing mode.

Although only the plurality of second patterns 102 and the plurality of fourth patterns 104 are used to operate the sensor unit 100 in the stylus sensing mode in FIG. 30, the plurality of first patterns 101 and the plurality of second patterns 102 may be used together in the stylus sensing mode in FIG. 31.

In case of the stylus sensing mode, the control unit 500 may sense the pen sensing signal received from the plurality of the first patterns 101 and the plurality of the third patterns 103 to detect the position of the stylus pen.

FIG. 32 is a view for explaining another example of operating the sensor unit 100 in FIG. 4 in the stylus sensing mode.

Although only the plurality of first patterns 101 and the plurality of third patterns 103 are used to operate the sensor unit 100 in FIG. 4 in the stylus sensing mode in FIG. 8, the plurality of second patterns 102 and the plurality of third patterns 103 may be used together in the stylus sensing mode in FIG. 32.

In case of the stylus sensing mode, the control unit 500 may sense the pen sensing signal received from the plurality of the second patterns 102 and the plurality of the third patterns 103 to detect the position of the stylus pen. Also, in case of the stylus sensing mode, the control unit 500 may sense the pen sensing signal received from the plurality of the first patterns 101 and the plurality of the fourth patterns 104 to detect the position of the stylus pen.

FIG. 33 is a view illustrating another modified example of the sensor unit 100 in FIG. 4.

When compared with the sensor unit 100 in FIG. 4, a sensor unit 100″ in FIG. 33 is different in a second pattern 102' and a fourth pattern 104' and further includes a plurality of fifth patterns 105', a plurality of sixth patterns 106', and a capacitor cap electrically connected to the fifth patterns 105' and the sixth patterns 106'. Since the rest components are the same as those described above, different portions will be described in detail below.

The second pattern 102' may be a bar pattern disposed in the first pattern 101 and extending in the second direction. Here, the second pattern 102' may have a constant width. The second pattern 102' is disposed on the same layer (2nd layer) as the first pattern 101.

The fourth pattern 104' may be a bar pattern disposed in the third pattern 103 and extending in the first direction. Here, the fourth pattern 104' may have a constant width. The fourth pattern 104' is disposed on the same layer ($1^{st}$ layer) as the third pattern 103.

The plurality of fifth patterns 105' are disposed on the same layer ($2^{nd}$ layer) as the plurality of first patterns 101 and arranged in the first direction and the second direction. The plurality of fifth patterns 105' may be arranged between the plurality of first patterns 101.

Each of the fifth patterns 105' has a shape corresponding to and overlapping a main pattern part of the third pattern 103 disposed on another layer ($1^{st}$ layer). Also, the fifth pattern 105' is electrically connected to the fourth pattern 104' disposed on another layer ($1^{st}$ layer) through a via.

The fifth patterns 105' electrically connected to one fourth pattern 104' among the plurality of fifth patterns 105' are arranged in the second direction. Here, a predetermined capacitor cap is connected to the fifth pattern 105' disposed at the other edge among the fifth patterns 105' arranged in the second direction. Also, the capacitor cap may be grounded. Here, the fifth pattern 105' disposed at the other edge among the fifth patterns 105' arranged in the second direction represents a pattern electrically connected to and spaced farthest from the control unit 500 in FIG. 4. Although not shown in the drawing, the capacitor cap may be connected between the fifth pattern 105' and ELVSS of a display panel (not shown). Also, the capacitor cap may have one end connected to the fifth pattern 105' and the other end connected to another layer ($1^{st}$ layer) on which the third pattern 103, the fourth pattern 104', and the sixth pattern 106' are disposed.

The plurality of fifth patterns 105' may form the mutual capacitance Cm in the vertical direction with the plurality of third patterns 103. Also, since the fifth pattern 105' is electrically connected to the fourth pattern 104' in the third pattern 103, the third pattern 103 may form the mutual capacitance Cm with the fifth pattern 105' in addition to the fourth pattern 104'.

The plurality of sixth patterns 106' are disposed on the same layer ($1^{st}$ layer) as the plurality of third patterns 103 and arranged in the first direction and the second direction. The plurality of sixth patterns 106' may be arranged between the plurality of third patterns 103.

Each of the sixth patterns 106 has a shape corresponding to and overlapping the main pattern part of the first pattern 101 disposed on another layer ($2^{nd}$ layer). Also, the sixth pattern 106' is electrically connected to the second pattern 102' disposed on another layer ($2^{nd}$ layer) through a via.

The sixth patterns 106' electrically connected to one second pattern 102' among the plurality of sixth patterns 106' are arranged in the first direction. Here, a predetermined capacitor cap is connected to the sixth pattern 106' disposed at the other edge among the sixth patterns 106' arranged in the first direction. Also, the capacitor cap may be grounded. Here, the sixth pattern 106' disposed at the other edge among the sixth patterns 106' arranged in the first direction represents a pattern electrically connected to and spaced farthest from the control unit 500 in FIG. 4. Although not shown in the drawing, the capacitor cap may be connected between the sixth pattern 106' and the ELVSS of the display panel (not shown). Also, the capacitor cap may have one end connected to the sixth pattern 106' and the other end connected to another layer ($2^{nd}$ layer) on which the third pattern 101, the second pattern 102', and the fifth pattern 105' are disposed.

The plurality of sixth patterns 106' may form the mutual capacitance Cm in the vertical direction with the plurality of first patterns 101. Also, since the sixth pattern 106' is electrically connected to the second pattern 102' in the first pattern 101, the first pattern 101 may form the mutual capacitance Cm with the sixth pattern 106' in addition to the second pattern 102'.

As described above, the sensor unit 100″″″ in FIG. 33 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 500 may increase to improve the stylus sensing sensitivity.

Since each of the second pattern 102' and the fourth pattern 104' does not have a diamond-shaped main pattern part unlike the second pattern 102 and the fourth pattern 104 of the sensor unit 100 of FIG. 4, when the display panel is disposed below the sensor unit 100″″″, visibility may be further improved in comparison with the sensor unit 100 of FIG. 4.

FIG. 34 is a view illustrating another modified example of the sensor unit 100 in FIG. 4.

In case of the sensor unit 100 of FIG. 4, when the stylus pen 50 is disposed on a right edge (or left edge) of the sensor unit 100, the stylus pen 50 may not provide a sufficient magnetic field, and a magnitude of a signal emitted from the stylus pen 50 is not large enough. In order to solve the above-described limitation, a sensor unit 100'″″″ in FIG. 34 further includes a first trace t1 and a second trace t2 in addition to the sensor unit 100 in FIG. 4.

The first trace t1 and the second trace t2 are directly connected to a conductive trace t0 electrically connecting the other end of the plurality of second patterns 102 to each other and disposed on a non-active area outside an active area tp (or touch area) of the touch input device. Here, at least a portion of the conductive trace to may be disposed outside the active area tp. The active area tp represents an area that is directly touched by an object, e.g., a finger or the stylus pen 50, and the non-active area is disposed around the active area tp. The non-active area may be, e.g., a bezel area.

Specifically, the first trace t1 may be disposed on the non-active area outside the active area tp and have one end directly connected to the conductive trace to and the other end connected to the driving circuit unit of the control unit 500 through a switch sw in one of the touch driving mode, the touch sensing mode, the antenna driving mode, and the stylus sensing mode.

The second trace t2 may be disposed on the non-active area outside the active area tp and have one end directly connected to the conductive trace to and the other end connected to the driving circuit unit of the control unit 500 through a switch sw in the antenna driving mode.

The first trace t1 may be disposed on the non-active area while surrounding one side of both left and right sides of the active area tp, and the second trace t2 may be disposed on the non-active area while surrounding the other side of the active area tp.

Although the stylus pen 50 is disposed at one edge of the active area tp when the first trace t1, the second trace t2, and the sensor unit 100'''''' are driven in the antenna driving mode as with FIG. 6, the stylus pen may provide a sufficient magnetic field signal. Thus, in the touch input device including the sensor unit 100'''''' in FIG. 34, the stylus pen 50 may receive a sufficient magnetic field signal and emit a sufficient signal although the stylus pen 50 is disposed on any portion of the active area tp.

Each of the first and second traces t1 and t2 of the sensor unit 100'''''' in FIG. 34 may correspond to one channel in FIG. 7, and the driving methods such as those in (a) to (c) of FIG. 7 may be directly used.

FIG. 35 is a view for explaining a first modified example of the fifth pattern 105 in FIG. 22.

Referring to FIG. 35, a fifth pattern 105' is disposed on a layer different from a layer on which the third pattern 103 and the fourth pattern 104 are disposed.

The fifth pattern 105' may have a shape corresponding to the third pattern 103. For example, the fifth pattern 105' may have a diamond shape and a diamond-shaped opening therein.

One portion of the fifth pattern 105' may overlap the third pattern 103 in the vertical direction, and the other portion may overlap the fourth pattern 104 in the vertical direction. For example, an outer edge of the fifth pattern 105' may overlap an inner edge of the third pattern 103 disposed on another layer. Also, an inner edge of the fifth pattern 105' may overlap an outer edge of the fourth pattern 104 disposed on another layer.

The fifth pattern 105' is electrically connected to the fourth pattern 104 disposed on another layer through a conductive via v. Here, the via v may be provided in plurality, and a plurality of vias v may be arranged on outer edge of the fourth pattern 104. The plurality of fifth patterns 105' may form the mutual capacitance Cm in the vertical direction with the third patterns 103 disposed on another layer. Also, since the fifth pattern 105' is electrically connected to the fourth pattern 104 in the third pattern 103 through the via v, the third pattern 103 may form a mutual capacitance Cc_Tx with the fifth pattern 105' in addition to the fourth pattern 104.

Although not shown in the drawing, the sixth pattern 106 in FIG. 22 may have the same shape as the fifth pattern 105' in FIG. 35. Here, a sixth pattern (not shown) may have an outer edge overlapping an inner edge of the first pattern 101 disposed on another layer and an inner edge overlapping an outer edge of the second pattern 102 disposed on another layer. Also, the sixth pattern (not shown) may be electrically connected to the second pattern 102 disposed on another layer through the conductive via. Likewise, the sixth pattern (not shown) may form the mutual capacitance in the vertical direction with the first pattern 101. Since the sixth pattern (not shown) is electrically connected to the second pattern 102 in the first pattern 101, the first pattern 101 may form the mutual capacitance Cc_Tx with the sixth pattern (not shown) in addition to the second pattern 102.

As described above, the sensor unit including the modified example of the fifth pattern 105' in FIG. 35 may form the mutual capacitance in the vertical direction as well as the horizontal direction of the third pattern 103, and the sensor unit including the modified example of the sixth pattern (not shown) may also form the mutual capacitance in the vertical direction as well as the horizontal direction of the first pattern 101. Thus, in the stylus sensing mode, the voltage value outputted from the sensing circuit unit of the control unit may increase to improve the stylus sensing sensitivity.

FIG. 36 is a view illustrating a modified example of FIG. 35.

FIG. 35 is a view illustrating a state in which the fifth pattern 105' is disposed below the third and fourth patterns 103 and 104, and on the contrary, FIG. 36 is a view illustrating a state in which the fifth pattern 105' is disposed on the third and fourth patterns 103 and 104.

A structure of the fifth pattern 105' in FIGS. 35 and 36 may be applied to the sensor units according to the above-described various embodiments.

FIG. 37 is a view for explaining a modified example of the fifth pattern 105' in FIG. 35.

Referring to FIG. 37, a fifth pattern 105" has the same shape and position as the fifth pattern 105' in FIG. 35. The fifth pattern 105" is different from the fifth pattern 105' in FIG. 35 in that the fifth pattern 105" is electrically connected to the third pattern 103 disposed on another layer through the conductive via v. Also, the via v is disposed on an inner edge of the third pattern 103.

Since the fifth pattern 105" is electrically connected to the third pattern 103 disposed on another layer, the fourth pattern 104 may form a mutual capacitance Cc_Tx in the vertical direction with the fifth pattern 105".

Also, the sensor unit including the modified example of the fifth pattern 105" in FIG. 37 may form the mutual capacitance in the vertical direction as well as the horizontal direction.

FIG. 38 is a view illustrating a modified example of FIG. 37.

FIG. 37 is a view illustrating a state in which the fifth pattern 105" is disposed below the third and fourth patterns 103 and 104, and on the contrary, FIG. 38 is a view illustrating a state in which the fifth pattern 105" is disposed on the third and fourth patterns 103 and 104.

A structure of the fifth pattern 105' in FIGS. 37 and 38 may be applied to the sensor units according to the above-described various embodiments.

FIGS. 39 and 40 are views for explaining modified examples of the third pattern 103 and the fourth pattern 104 in the sensor unit in FIG. 23 or 24.

Referring to FIGS. 39 and 40, the third pattern 103 and the fourth pattern 104 according to a modified example are disposed on different layers, and a portion of the third pattern 103 and a portion of the fourth pattern 104 overlap each other in the vertical direction (perpendicular direction). For example, an inner edge of the third pattern 103 may overlap an outer edge of the fourth pattern 104 in the vertical direction. FIG. 39 is a view illustrating a state in which the third pattern 103 is disposed on the fourth pattern 104, and FIG. 40 is a view illustrating a state in which the third pattern 103 is disposed below the fourth pattern 104.

A sensor unit including the third and fourth patterns 103 and 104 in FIGS. 39 and 40 may form the mutual capacitance Cc_Tx in the vertical direction instead of the horizontal direction. Although not shown in the drawing, the first and second patterns 101 and 102 in FIGS. 23 and 24 may have the same structures as that in FIGS. 39 and 40

A structure according to the modified example in FIGS. 39 and 40 may be applied to the sensor units according to the above-described various embodiments.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present invention.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. For example, each component specifically described in the embodiment may be modified and implemented. In addition to variations and modifications in the components and/or arrangements, alternative uses will also be apparent to those skilled in the art.

The invention claimed is:

1. A touch input device comprising:
a sensor unit; and
a control unit configured to control the sensor unit,
wherein the sensor unit comprises:
a first pattern extending in a first direction;
a second pattern disposed adjacent to the first pattern and extending in the first direction;
a third pattern extending in a second direction different from the first direction; and
a fourth pattern disposed adjacent to the third pattern and extending in the second direction,
wherein each of the first and second patterns is provided in plurality along the second direction,
each of the third and fourth patterns is provided in plurality along the first direction,
the plurality of first and third patterns have one ends electrically connected to the control unit and the other ends electrically opened,
the plurality of second patterns have the other ends that are electrically connected to each other, and
the plurality of fourth patterns have the other ends that are electrically connected to each other.

2. A touch input device comprising:
a sensor unit; and
a control unit configured to control the sensor unit,
wherein the sensor unit comprises:
a first pattern comprising first-a and first-b patterns alternately arranged in a first direction;
a second pattern disposed adjacent to the first pattern;
a third pattern extending in a second direction different from the first direction; and
a fourth pattern disposed adjacent to the third pattern and extending in the second direction,
wherein the first-a patterns are electrically connected to each other, and the first-b patterns are electrically connected to each other,
each of the first and second patterns is provided in plurality along the second direction,
each of the third and fourth patterns is provided in plurality along the first direction,
the plurality of first and third patterns have one ends electrically connected to the control unit and the other ends electrically opened,
the plurality of second patterns have the other ends that are electrically connected to each other, and
the plurality of fourth patterns have the other ends that are electrically connected to each other.

3. A touch input device comprising:
a sensor unit; and
a control unit configured to control the sensor unit,
wherein the sensor unit comprises:
a plurality of first patterns arranged in a first direction and a second direction different from the first direction and each having an opening;
a plurality of second patterns disposed in the openings of the plurality of first patterns, respectively;
a plurality of third patterns disposed on the same layer as the plurality of first patterns, each extending in the second direction, and each having an opening; and
a plurality of fourth patterns disposed in the openings of the plurality of third patterns, respectively, and each extending in the second direction,
wherein the first patterns arranged in the first direction among the plurality of first patterns are electrically connected to each other through a conductive bridge,
among the first patterns arranged in the first direction, the first pattern disposed at one side is connected to the control unit, and the first pattern disposed at the other side is electrically opened,
the second patterns arranged in the first direction among the plurality of second patterns are electrically connected to each other through a conductive bridge,
the second pattern disposed at the other side among the second patterns arranged in the first direction is connected to the second patterns arranged in the second direction,
the plurality of third patterns have one ends electrically connected to the control unit and the other ends electrically opened, and
the plurality of fourth patterns have the other ends that are electrically connected to each other.

4. A touch input device comprising:
a sensor unit; and
a control unit configured to control the sensor unit,
wherein the sensor unit comprises:
a first pattern extending in a first direction and having an opening;
a second pattern disposed on the same layer as the first pattern, disposed in the opening of the first pattern, and extending in the first direction;
a third pattern disposed on a different layer from the first pattern, extending in a second direction different from the first direction, and having an opening;
a fourth pattern disposed on the same layer as the third pattern, disposed in the opening of the third pattern, and extending in the second direction;
a fifth pattern disposed on the same layer as the first pattern, having a shape corresponding to a portion of the third pattern to overlap the third pattern, and electrically connected to the fourth pattern; and
a sixth pattern disposed on the same layer as the third pattern, having a shape corresponding to a portion of the first pattern to overlap the first pattern, and electrically connected to the second pattern,
wherein each of the first and second patterns is provided in plurality along the second direction, each of the third and fourth patterns is provided in plurality along the first direction, each of the fifth and sixth patterns is provided in plurality along the first and second directions, the plurality of first and third patterns have one ends electrically connected to the control unit and the other ends electrically opened, the plurality of second patterns have the other ends that are electrically connected to each other, and the plurality of fourth patterns have the other ends that are electrically connected to each other.

5. A touch input device comprising:

a sensor unit; and a control unit configured to control the sensor unit, wherein the sensor unit comprises:

a first pattern extending in a first direction;

a second pattern disposed adjacent to the first pattern and extending in the first direction;

a third pattern extending in a second direction different from the first direction; and a fourth pattern disposed adjacent to the third pattern and extending in the second direction, wherein each of the first and second patterns is provided in plurality along the second direction, each of the third and fourth patterns is provided in plurality along the first direction, the plurality of first and third patterns have one ends electrically connected to the control unit and the other ends electrically opened, the plurality of second patterns have the other ends that are electrically connected to each other, the plurality of fourth patterns have the other ends that are electrically connected to each other, the plurality of first to fourth patterns are disposed in an active area, and the sensor unit comprises at least one trace having one end connected to the control unit and the other end connected to the other ends of the plurality of second patterns and disposed in a non-active area outside the active area.

6. A touch input device comprising:

a sensor unit; and a control unit configured to control the sensor unit, wherein the sensor unit comprises:

a plurality of first patterns arranged in a first direction; and a plurality of second patterns arranged in a second direction different from the first direction, wherein, among the plurality of first patterns, the first pattern disposed at one edge is connected to the control unit, and the first pattern disposed at the other edge is connected to a capacitor, and among the plurality of second patterns, the second pattern disposed at one edge is connected to the control unit, and the second pattern disposed at the other edge is connected to a capacitor.

\* \* \* \* \*